(12) United States Patent
Smolen et al.

(10) Patent No.: US 7,792,791 B2
(45) Date of Patent: Sep. 7, 2010

(54) SYSTEMS AND METHODS FOR ESTABLISHING AUTHENTICITY OF ELECTRONIC RECORDS IN AN ARCHIVES SYSTEM

(75) Inventors: Richard Smolen, North Potomac, MD (US); Fred Y. Robinson, Bethesda, MD (US); Gregory S. Hunter, Mineola, NY (US); Roy S. Rogers, IV, Middletown, MD (US); Matthew J. McKennirey, Bethesda, MD (US); Mark J. Evans, Silver Spring, MD (US); Ken Bedford, Reston, VA (US)

(73) Assignees: Lockheed Martin Corporation, Bethesda, MD (US); Hunter Information Management Services, Inc., Mineola, NY (US); Fenestra Technologies Corporation, Germantown, MD (US); Tessella Inc., Newton, MA (US); Electronic Data Systems Corporation, Plano, TX (US)

(*) Notice: Subject to any disclaimer, the term of this patent is extended or adjusted under 35 U.S.C. 154(b) by 457 days.

(21) Appl. No.: 11/797,278

(22) Filed: May 2, 2007

(65) Prior Publication Data

US 2007/0283417 A1 Dec. 6, 2007

Related U.S. Application Data

(60) Provisional application No. 60/797,754, filed on May 5, 2006, provisional application No. 60/802,875, filed on May 24, 2006.

(51) Int. Cl.
*G06F 7/00* (2006.01)
*G06F 17/00* (2006.01)

(52) U.S. Cl. .................. 707/609; 713/161

(58) Field of Classification Search ........... 707/1–10, 707/100–104.1, 200–206; 713/159, 182, 713/161; 715/741–743
See application file for complete search history.

(56) References Cited

U.S. PATENT DOCUMENTS

| | | | | |
|---|---|---|---|---|
| 6,604,110 | B1 | 8/2003 | Savage et al. | 707/102 |
| 2007/0061567 | A1* | 3/2007 | Day et al. | 713/159 |
| 2008/0072290 | A1* | 3/2008 | Metzer et al. | 726/3 |

FOREIGN PATENT DOCUMENTS

EP 1 146 440 A2 10/2001

OTHER PUBLICATIONS

Moore et al., Collection-Based Persistent Digital Archives—Part 1, Mar. 2000, vol. 6, D-Lib Magazine, 1-17.*

(Continued)

*Primary Examiner*—Jean B Fleurantin
(74) *Attorney, Agent, or Firm*—Nixon & Vanderhye P.C.

(57) ABSTRACT

Systems and/or methods for establishing and maintaining authenticity of a plurality of records and/or documentary materials to be persisted in an electronic archives system are provided. Each record and/or documentary material may be safeguarded throughout its entire lifecycle by monitoring and recording both intended changes to each said record and/or documentary material and its corresponding status, as well as unintended changes to each said record and/or documentary material. Context and structure associated with each said record and/or documentary material may be extracted and preserved. Substantially uninterrupted proof-of-custody including at least a source may be established and preserved for each said record and/or documentary material throughout its entire lifecycle. Essential characteristics of each said record and/or documentary material may be captured and preserved throughout its lifecycle in dependence on one or more changeable definitions of essential characteristic. The plurality of record and/or documentary material and all preserved information may be stored. The archives system may be scalable essentially without limitation. The authenticity of the plurality of record and/or documentary material may be comprehensively storable and maintainable over an indefinite period of time in a substantially obsolescence-proof manner despite changeability of the records and/or documentary materials, record and/or documentary material custody, and/or essential characteristic definitions.

38 Claims, 10 Drawing Sheets

OTHER PUBLICATIONS

Raymond A. Lorie., Long term preservation of digital information, Jun. 2001, ACM, 346-352.*

Preservation of digital data with self-validating, self-instantiating knowledge-based archives, Sep. 2001, ACM, vol. 30, 54-63.*

European Search Report issued for European Patent Application No. 07251876.4, dated Apr. 24, 2008.

Berthon et al., "Safekeeping: A Cooperative Approach to Building a Digital Preservation Resource," D-Lib Magazine, vol. 8, No. 1, Jan. 2002, pp. 1-7.

Day, Michael, "CEDARS: Digital Preservation and Metadata," Delos Workshop: Preservation of Digital Information, Jun. 1998, pp. 53-58.

Lee, et al., "The State of the Art and Practice in Digital Preservation," Journal of Research of the National Institute of Standards and Technology, Jan. 2002, pp. 93-106.

Mao, et al., "A Dynamic Feature Generation System of Automated Metadata Extraction in Preservation of Digital Materials," Proceedings of the First International Workshop on Document Image Analysis for Libraries (DIAL '04), Jan. 2004, pp. 225-232.

European Search Report issued for European Patent Application No. 07251876.4, dated Jul. 10, 2008.

Menezes A. J. et al., "Hash Functions and Data Integrity," Handbook of Applied Cryptography, Jan. 1997, pp. 321-383.

Choudhury A. K. et al., "Copyright Protection for Electronic Publishing Over Computer Networks," IEEE Network, IEEE Service Center, vol. 9, No. 3, May 1, 1995, pp. 12-20.

* cited by examiner

SYSTEMS AND METHODS FOR ESTABLISHING AUTHENTICITY OF ELECTRONIC RECORDS IN AN ARCHIVES SYSTEM

CROSS-REFERENCES TO RELATED APPLICATIONS

This application claims the benefit of Application Ser. No. 60/802,875, filed on May 24, 2006, and Application Ser. No. 60/797,754, filed on May 5, 2006, each of which is incorporated herein by reference in its entirety.

FIELD OF THE INVENTION

The example embodiments disclosed herein relate to systems and/or methods for establishing authenticity of electronic records in an archives system including any system for retaining digital information. More particularly, certain example embodiments disclosed herein relate to techniques that are scalable essentially without limitation for establishing and maintaining comprehensive authenticity of electronic records over an indefinite period of time in a substantially obsolescence-proof manner.

BACKGROUND AND SUMMARY OF THE INVENTION

1. Introduction

Since the earliest history, various institutions (e.g., governments and private companies alike) have recorded their actions and transactions. Subsequent generations have used these archival records to understand the history of the institution, the national heritage, and the human journey. These records may be essential to support the efficiency of the institution, to protect the rights of individuals and businesses, and/or to ensure that the private company or public corporation/company is accountable to its employees/shareholders and/or that the Government is accountable to its citizens.

With the advance of technology into a dynamic and unpredictable digital era, evidence of the acts and facts of institutions and the government and our national heritage are at risk of being irrecoverably lost. The challenge is pressing—as time moves forward and technologies become obsolete, the risks of loss increase. It will be appreciated that a need has developed in the art to develop an electronic records archives system and method especially, but not only, for the National Archives and Records Administration (NARA) in a system known as Electronic Records Archives (ERA), to resolve this growing problem, in a way that is substantially obsolescence-proof and policy neutral. While embodiments of the invention will be described with respect to its application for safeguarding government records, the described embodiments are not limited to archives systems applications nor to governmental applications and can also be applied to other large scale storage applications, in addition to archives systems, and for businesses, charitable (e.g., non-profit) and other institutions, and entities.

One aspect of the invention is directed to an architecture that will support operational, functional, physical, and interface changes as they occur. In one example, a suite of commercial off-the-shelf (COTS) hardware and software products has been selected to implement and deploy an embodiment of the invention in the ERA, but the inventive architecture is not limited to these products. The architecture facilitates seamless COTS product replacement without negatively impacting the ERA system.

1.1 Understanding the Problem

Another aspect of the ERA is to preserve and to provide ready access to authentic electronic records of enduring value.

In one embodiment, the ERA supports and flows from NARA's mission to ensure "for the Citizen and the Public Servant, for the President and the Congress and the Courts, ready access to essential evidence." This mission facilitates the exchange of vital ideas and information that sustains the United States of America. NARA is responsible to the American people as the custodian of a diverse and expanding array of evidence of America's culture and heritage, of the actions taken by public servants on behalf of American citizens, and of the rights of American citizens. The core of NARA's mission is that this essential evidence must be identified, preserved, and made available for as long as authentic records are needed—regardless of form.

The creation and use of an unprecedented and increasing volume of Federal electronic records—in a wide variety of formats, using evolving technologies—poses a problem that the ERA must solve. An aspect of the invention involves an integrated ERA solution supporting NARA's evolving business processes to identify, preserve, and make available authentic, electronic records of enduring value—for as long as they are needed.

In another embodiment, the ERA can be used to store, process, and/or disseminate a private institution's records. That is, in an embodiment, the ERA may store records pertaining to a private institution or association, and/or the ERA may be used by a first entity to store the records of a second entity. System solutions, no matter how elegant, may be integrated with the institutional culture and organizational processes of the users.

1.1.1 NARA's Evolving Business Processes

Since 1934, NARA has developed effective and innovative processes to manage the records created or received, maintained or used, and destroyed or preserved in the course of public business transacted throughout the Federal Government. NARA played a role in developing this records lifecycle concept and related business processes to ensure long-term preservation of, and access to, authentic archival records. NARA also has been instrumental in developing the archival concept of an authentic record that consists of four fundamental attributes: content, structure, context, and presentation.

NARA has been managing electronic records of archival value since 1968, longer than almost anyone in the world. Despite this long history, the diverse formats and expanding volume of current electronic records pose new challenges and opportunities for NARA as it seeks to identify records of enduring value, preserve these records as vital evidence of our nation's past, and make these records accessible to citizens and public servants in accordance with statutory requirements.

The ERA should support, and may affect, the institution's (e.g., NARA's) evolving business processes. These business processes mirror the records lifecycle and are embodied in the agency's statutory authority:

Providing guidance to Federal Agencies regarding records creation and records management;
Scheduling records for appropriate disposition;
Storing and preserving records of enduring value; and/or
Making records available in accordance with statutory and regulatory provisions.

Within this lifecycle framework, the ERA solution provides an integrated and automated capability to manage electronic records from: the identification and capture of records of enduring value; through the storage, preservation, and description of the records; to access control and retrieval functions.

Developing the ERA involves far more than just warehousing data. For example, the archival mission is to identify, preserve, and make available records of enduring value, regardless of form. This three-part archival mission is the core of the Open Archival Information System (OAIS) Reference Model, expressed as ingest, archival storage, and access. Thus, one ERA solution is built around the generic OAIS Reference Model (presented in FIG. 1), which supports these core archival functions through data management, administration, and preservation planning.

The ERA may coordinate with the front-end activities of the creation, use, and maintenance of electronic records by Federal officials. This may be accomplished through the implementation of disposition agreements for electronic records and the development of templates or schemas that define the content, context, structure, and presentation of electronic records along with lifecycle data referring to these records.

The ERA solution may complement NARA's other activities and priorities, e.g., by improving the interaction between NARA staff and their customers (in the areas of scheduling, transfer, accessioning, verification, preservation, review and redaction, and/or ultimately the ease of finding and retrieving electronic records).

1.1.2 Encompassing a Broad Scope of Records

Like NARA itself, the scope of ERA includes the management of electronic and non-electronic records, permanent and temporary records, and records transferred from Federal entities as well as those donated by individuals or organizations outside of the government. Each type of record is described and/or defined below.

ERA and Non-Electronic Records: Although the focus of ERA is on preserving and providing access to authentic electronic records of enduring value, the system's scope also includes, for example, management of specific lifecycle activities for non-electronic records. ERA will support a set of lifecycle management processes (such as those used for NARA) for appraisal, scheduling, disposition, transfer, accessioning, and description of both electronic and non-electronic records. A common systems approach to appraisal and scheduling through ERA will improve the efficiency of such tasks for non-electronic records and help ensure that permanent electronic records are identified as early as possible within the records lifecycle. This same common approach will automate aspects of the disposition, transfer, accessioning, and description processes for all types of records that will result in significant workflow efficiencies. Archivists, researchers, and other users may realize benefits by having descriptions of both electronic and non-electronic records available together in a powerful, universal catalog of holdings. In an embodiment, some of ERA's capabilities regarding non-electronic records may come from subsuming the functionality of legacy systems such the Archival Research Catalog (ARC). To effectively manage lifecycle data for all types of records, in certain embodiments, ERA also may maintain data interchange (but not subsume) other legacy systems and likely future systems related to non-electronic records.

Permanent and Temporary Records: There is a fundamental archival distinction between records of enduring historic value, such as those that NARA must retain forever (e.g., permanent records) and those records that a government must retain for a finite period of time to conduct ongoing business, meet statutory and regulatory requirements, or protect rights and interests (e.g., temporary records).

For a particular record series from the US Federal Government, NARA identifies these distinctions during the record appraisal and scheduling processes and they are reflected in NARA-approved disposition agreements and instructions. Specific records are actually categorized as permanent or temporary during the disposition and accessioning processes. NARA takes physical custody of all permanent records and some temporary records, in accordance with approved disposition agreements and instructions. While all temporary records are eventually destroyed, NARA ultimately acquires legal (in addition to physical) custody over all permanent records.

ERA may address the distinction between permanent and temporary records at various stages of the records life-cycle. ERA may facilitate an organization's records appraisal and scheduling processes where archivists and transferring entities may use the system to clearly identify records as either permanent or temporary in connection with the development and approval of disposition agreements and instructions. The ERA may use this disposition information in association with the templates to recognize the distinctions between permanent and temporary records upon ingest and manage these records within the system accordingly.

For permanent records this may involve transformation to persistent formats or use of enhanced preservation techniques to insure their preservation and accessibility forever. This also may apply to temporary records of long-term value, such as, for example, medical records. For example, any record that must be retained beyond the life of its originating system may need one or more "transformations" that maintain the authenticity of the records. For temporary records, NARA's Records Center Program (RCP) is exploring offering its customers an ERA service to ingest and store long-term temporary records in persistent formats. To the degree that the RCP opts to facilitate their customers' access to the ERA for appropriate preservation of long-term temporary electronic records, this same coordination relationship with transferring entities through the RCP will allow NARA to effectively capture permanent electronic records earlier in the records lifecycle. In the end, ERA may also provide for the ultimate destruction of temporary electronic records.

ERA and Donated Materials: In addition to federal records, NARA also receives and accesses donated archival materials. Such donated collections comprise a significant percentage of NARA's Presidential Library holdings, for example. ERA may manage donated electronic records in accordance with deeds of gift of deposit agreements which, when associated with templates, may ensure that these records are properly preserved and made available to users. Although donated materials may involve unusual disposition instructions or access restrictions, ERA should be flexible enough to adapt to these requirements. Since individuals or institutions donating materials to NARA are likely to be less familiar with ERA than federal transferring entities, the system may also include guidance and tools to help donors and the NARA appraisal staff working with them insure proper ingest, preservation, dissemination of donated materials.

1.1.3 Meeting the Needs of Users

Systems are designed to facilitate the work of users, and not the other way around. One or more of the following illustrative classes of users may interact with the ERA: transferring entity; appraiser; records processor; preserver; access reviewer; consumer; administrative user; and/or a manager. The ERA may take into account data security, business process re-engineering, and/or systems development and integration. The ERA solution also may provide easy access to the tools the users need to process and use electronic records holdings efficiently.

1.2 Mitigating Risks and Meeting Challenges

NARA must meet challenges relating to archiving massive amounts of information, or the American people risk losing essential evidence that is only available in the form of electronic federal records. But beyond mitigating substantial risks, the ERA affords such opportunities as:

Using digital communication tools, such as the Internet, to make electronic records holdings, such as NARA's, available beyond the research room walls in offices, schools, and homes throughout the country and around the world;

Allowing users to take advantage of the information-processing efficiencies and capabilities afforded by electronic records;

Increasing the return on the public's investment by demonstrating technological solutions to electronic records problems that will be applied throughout our digital society in a wide variety of institutional settings; and/or Developing tools for archivists to perform their functions more efficiently.

According to one aspect of the invention, there is provided a system for ingesting, storing, and/or disseminating information. The system may include an ingest module, a storage module, and a dissemination module that may be accessed by a user via one or more portals.

In an aspect of certain embodiments, there is provided a system and method for automatically identifying, preserving, and disseminating archived materials. The system/method may include extreme scale archives storage architecture with redundancy or at least survivability, suitable for the evolution from terabytes to exabytes, etc.

In another aspect of certain embodiments, there is provided an electronic records archives (ERA), comprising an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record or file. The storage module may include structure or a program to preserve authenticity of the file or record over time, and/or to preserve the physical access to the record or file over time. The access module may include structure and/or a program to provide a user with the ability to view/render the record or file over time, to control access to restricted records, to redact restricted or classified records, and/or to provide access to an increasing number of users anywhere at any time.

The ingest module may include structure or a program to auto-generate a description of the file or record. Each record may be transformed, e.g., using a framework that wraps and computerizes the record in a self-describing format with appropriate metadata to represent information in the template.

The ingest module, may include structure or a program to process a Submission Information Package (SIP), and/or an Archival Information Package (AIP). The access module may include structure or a program to process a Dissemination Information Packages (DIP).

Independent aspects of the invention may include the ingest module alone or one or more aspects thereof, the storage module alone or one or more aspects thereof; and/or the access module alone or one or more aspects thereof.

Still further aspects of the invention relate to methods for carrying out one or more functions of the ERA or components thereof (ingest module, storage module, and/or access module).

1.3 Archival Problems in General and Drawbacks of Existing Solutions

It is not enough just to preserve electronic records. Now and into the future, archivists must be able to attest to the authenticity of the preserved records to protect the rights and interests of various constituents. If records cannot be certified as authentic, there is a risk of unraveling the trust system upon which society is based In the words of Jeff Rothenberg of the Rand Corporation:

The relationship between digital preservation and authenticity stems from the fact that meaningful preservation implies the usability of that which is preserved. That is, the goal of preservation is to allow future users to retrieve, access, decipher, view, interpret, understand, and experience documents, data, and records in meaningful and valid (that is authentic) ways. An informational entity that is "preserved" without being usable in a meaningful and valid way has not been meaningfully preserved, i.e., has not been preserved at all.

The difficulty of defining a viable digital preservation strategy is partly the result of our failing to understand and appreciate the authenticity issues surrounding digital informational entities and the implications of these issues for potential technical solutions to the digital preservation problem. (See Jeff Rothenberg, Preserving Authentic Digital Information," in *Authenticity in a Digital Environment*, May 2000. Council on Library and Information Resources, pages 51-68. Available at: www.clir.org/pubs/abstract/pub92abst.html.)

In order to establish a common understanding, it is important to clarify four key concepts and the relationships among them—namely, reliability, authenticity, authentication, and trustworthiness.

1.3.1 Reliability

The InterPARES Project, an international collaboration researching the preservation of electronic records, defined reliability and authenticity. These definitions, in turn, have been adopted by most subsequent research projects and initiatives. A reliable record stands for the facts it contains—the record's content can be trusted. The reliability of a record depends upon, for example the completeness of the record's form, the control exercised over the process of creation, etc.

A reliable record has authority—that is, there is knowledge of who created the record, when it was created, how it was created, and the purpose for which it was created. Reliability generally is more the concern of the record's creator than its preserver. In some ways, reliability is a "given" (e.g., must be assumed) before records ever reach the electronic archives. Although unreliable records generally cannot be made reliable, the issue of reliability cannot be ignored.

In this vein, there are two options for establishing a policy related to the reliability of submitted records. First, all records submitted by institutions may be accepted. In this case it will be assumed that the records are reliable because the providers say so. Second, reliability criteria that providers must meet before records will be accepted may be established. The criteria may deal with completeness of the record, procedural controls over the creation of the records, etc. For example, the Authenticity Task Force of the InterPARES Project has established a set of criteria that may be used as a basis for setting such criteria.

1.3.2 Authenticity

The InterPARES Project defines an authentic record as "a record that is what it purports to be and is free from tampering or corruption." Broadly considered, the authenticity of records depends upon actions by both the Records Creator and the Records Preserver. In particular, the Records Creator generally is concerned with the "truth" of the original record, including, for example, the mode, form, and/or state of transmission of the records as drafts, originals, and/or copies. The Records Preserver generally is concerned with the manner of the maintenance, preservation, and custody of the records. The mode of transmission of the record generally is the means used to transmit a record across space and time, whereas the form of transmission generally is the physical carrier on which a record is received (e.g., paper, film, disk, magnetic tape, etc.).

For a record to be authentic (meaning that the record remains reliable over time), its preservation should occur under strict controls. Some questions that may be used when determining whether a record is authentic follow:

When was a record copied or migrated?
Who did the copying or migration?
How did the copying or migration take place?
What quality control processes governed the copying or migration?

"Trust" and "truthfulness" have become key aspects of an authentic record. Because conformity with "the truth" is a judgment, a determination of authenticity likewise will be a judgment. For example, though it is necessary to have an accurate bit stream, such a bit stream is not sufficient to have an "authentic record." It is this broad sense of authenticity that must be addressed. Indeed, authenticity includes issues such as, for example, integrity, completeness, correctness, validity, faithfulness to an original, meaningfulness, and suitability for an intended purpose.

1.3.3 Authentication

Although "authenticity" and "authentication" often are used together, they sometimes may be thought of as quite different concepts. By way of example and without limitation, authentication sometimes may be thought of as being a narrower term than authenticity. For example, authentication generally is a declaration about a record at a given time. The rules governing authentication may be established by legislation or other policy. Authentication generally means that the custodian of a record issues a statement saying that a record is authentic at this time. Authentication thus may be thought of as being external to the record itself and is temporary (as opposed to authenticity, which is a quality of the record that is to be constantly protected over the long-term). An "authenticated record" only can be as reliable as when the record was first issued by its creator. It certain embodiments, it may be useful to authenticate (e.g., certify) a record from time-to-time to indicate that authenticity is being maintained.

1.3.4 Trustworthiness

The Minnesota Historical Society has defined the concept of a "trustworthy information system." As stated in the *TIS Handbook*, "Trustworthiness refers to an information system's accountability and its ability to produce reliable and authentic information and records." In an embodiment, documentation and metadata are a part of a trustworthy information system, as they are useful in proper data creation, storage, retrieval, modification, retention, destruction, and the like.

Ensuring the authenticity over time of digital records is a major concern that has at least two aspects. A first aspect relates to checking and certifying data integrity (e.g., associated with technical processes such as integrity checking, certification, digital watermarking, steganography, and/or user and authentication protocols). A second aspect relates to identifying the intellectual qualities of information that make it authentic (e.g., associated with legal, cultural, and/or philosophical concepts such as trustworthiness and completeness).

According to Anne Gilliland-Swetland, "Preserving knowledge is more complex than preserving only media or content. It is about preserving the intellectual integrity of information objects, including capturing information about the various contexts within which information is created, organized, and used; organic relationships with other information objects; and characteristics that provide meaning and evidential value." Accordingly, one feature of certain example embodiments relates to preserving knowledge and making it available. This complex task involves both technical and intellectual challenges.

Unfortunately, commercial systems for electronic archiving are built around storage and/or workflow technologies but do not provide the highest levels of authenticity support over indefinite periods of time. Moreover, commercial systems also tend to target archival needs within an enterprise and sometimes for compliance with targeted government regulations, such as Sarbanes Oxley, whereas a complete archives system (such as NARA) must accept records and other associated electronic assets (e.g., administrative information about the records) from other enterprises and has more stringent archival requirements. For example, as the custodian of the nation's archived electronic assets, NARA has to support basic rights of citizens and obligations of the government, such as military pensions and patents, which lead, for example, to indefinite retention requirements. Also, current electronic records archives systems and processes are manually intensive and do not provide comprehensive support for electronic records authenticity.

For example, it is noted that there are current commercial off-the-shelf (COTS) products that provide some elements of authenticity, but not all elements. EMC's Documentum and Centera products are examples. Certain example systems have implemented Documentum for forms (e.g., entry), workflow infrastructure, and content management of some data (e.g., business objects). Centera is a storage system that provides protection and some metadata and search capabilities, but it does not provide processes for authenticity. In general, COTS products would address specific regulatory requirements, such as, for example, Sarbanes Oxley, if anything, which target commercial business, rather than more stringent needs (e.g., of NARA) that the drive innovative solution of the example embodiments.

Thus, it will be appreciated that there is a need in the art for improved systems and/or methods that is/are scalable essentially without limitation for establishing and maintaining comprehensive authenticity of electronic records over an indefinite period of time in a substantially obsolescence-proof manner.

According to certain example embodiments, a system for establishing and maintaining authenticity of a plurality of records and/or documentary materials to be persisted in an electronic archives system is provided. Safeguarding programmed logic circuitry may be configured to safeguard each said record and/or documentary material throughout its entire lifecycle by monitoring and recording both intended changes to each said record and/or documentary material and its corresponding status, as well as unintended changes to each said record and/or documentary material. Extracting and preserving programmed logic circuitry may be configured to extract and preserve context and structure associated with each said record and/or documentary material. Custody programmed logic circuitry may be configured to establish and preserve substantially uninterrupted proof-of-custody including at least a source for each said record and/or documentary material throughout its entire lifecycle. Essential characteristic programmed logic circuitry may be configured to capture and preserve essential characteristics of each said record and/or documentary material throughout its lifecycle in dependence on one or more changeable definitions of essential characteristic. At least one storage location may be configured to store the plurality of records and/or documentary materials and all preserved information. The archives system may be scalable essentially without limitation. The authenticity of the plurality of records and/or documentary materials may be comprehensively storable and maintainable over an indefinite period of time in a substantially obsolescence-proof manner despite changeability of the records and/or documentary materials, record and/or documentary material custody, and/or essential characteristic definitions.

According to certain other example embodiments, a computer-implemented method tangibly embodied by at least instructions stored on a computer-readable storage medium for establishing and maintaining authenticity of a plurality of records and/or documentary materials to be persisted in an electronic archives system is provided. Each record and/or documentary material may be safeguarded throughout its entire lifecycle by monitoring and recording both intended changes to each said record and/or documentary material and its corresponding status, as well as unintended changes to each said record and/or documentary material. Context and structure associated with each said record and/or documentary material may be extracted and preserved. Substantially uninterrupted proof-of-custody including at least a source may be established and preserved for each said record and/or documentary material throughout its entire lifecycle. Essential characteristics of each said record and/or documentary material may be captured and preserved throughout its lifecycle in dependence on one or more changeable definitions of essential characteristic. The plurality of record and/or documentary material and all preserved information may be stored. The archives system may be scalable essentially without limitation. The authenticity of the plurality of record and/or documentary material may be comprehensively storable and maintainable over an indefinite period of time in a substantially obsolescence-proof manner despite changeability of the records and/or documentary materials, record and/or documentary material custody, and/or essential characteristic definitions.

According to still other example embodiments, a computer-implemented method tangibly embodied by at least instructions stored on a computer-readable storage medium for establishing and maintaining authenticity of a plurality of records and/or documentary materials to be persisted in an electronic archives system is provided. Transfer media from a transferring entity may be inspected to ensure that said transfer media contains at least one record and/or documentary material to be ingested. The at least one record and/or documentary material to be ingested may be stored in a temporary storage location. That the transfer media is mounted for upload into the system may be ensured. At least one security and/or integrity check may be performed on the transfer media. At least one validation check may be performed on the at least one record's and/or documentary material's bitstream. The at least one record and/or documentary material may be stored to at least one managed storage location. Any outstanding verification issues with the transferring entity may be resolved. Necessary metadata for the at least one record's and/or documentary material's lifecycle may be persisted. The archives system may be scalable essentially without limitation. The authenticity of the plurality of records and/or documentary materials may be comprehensively storable and maintainable over an indefinite period of time in a substantially obsolescence-proof manner despite changeability of the records and/or documentary materials, record and/or documentary material custody, and/or essential characteristic definitions.

It will be appreciated that these techniques may be applied to records, assets, and/or documentary materials. It also will be appreciated that documentary materials may encompass a variety of different items. For example, in certain embodiments, documentary materials may be considered a collective term for records, nonrecord materials, and/or personal papers, that refers to all media on which information is recorded, regardless of the nature of the medium or the method or circumstances of recording. In certain other embodiments, documentary materials may include, for example, records (e.g., temporary and/or permanent), non-record material, personal papers or artifacts that refer to all media containing recorded information, regardless of the nature of the media or the method(s) or circumstance(s) of recording. In still other embodiments, documentary materials may be comprised of electronic information on physical media or paper records that are shipped to the archives in containers (e.g. box, envelope, etc), and those documentary materials that include electronic information may be transmitted via HTTPS or SFTP and divided into virtual electronic containers by the system. This need not be a user activity, but instead may be performed by the packaging tool as an aid to optimize transmission via electronic means.

It will be appreciated that as used herein, the term "subroutine" is broad enough to encompass any suitable combination of hardware, software, and any other form of programmed logic circuitry (which itself may be any suitable combination of hardware, software, firmware, or the like) capable of accomplishing a specified function. It also will be appreciated that the above-described embodiments, and the elements thereof, may be used alone or in various combinations to realize yet further embodiments.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION

The following description includes several examples and/or embodiments of computer-driven systems and/or methods for carrying out automated information storage, processing and/or access. In particular, one or more examples and embodiments are focused on systems and/or methods oriented specifically for use with the U.S. National Archives and Records Administration (NARA). However, it will be recognized that, while one or more portions of the present specification may be limited in application to NARA's specific requirements, most if not all of the described systems and/or methods have broader application. For example, the implementations described for storage, processing, and/or access to information (also sometimes referred to as ingest, storage, and dissemination) can also apply to any institution that requires and/or desires automated archiving and/or preservation of its information, e.g., documents, email, corporate IP/knowledge, etc. The term "institution" includes at least government agencies or entities, private companies, publicly traded corporations, universities and colleges, charitable or non-profit organizations, etc. Moreover, the term "electronic records archive" (ERA) is intended to encompass a storage, processing, and/or access archives for any institution, regardless of nature or size.

Figure 1:
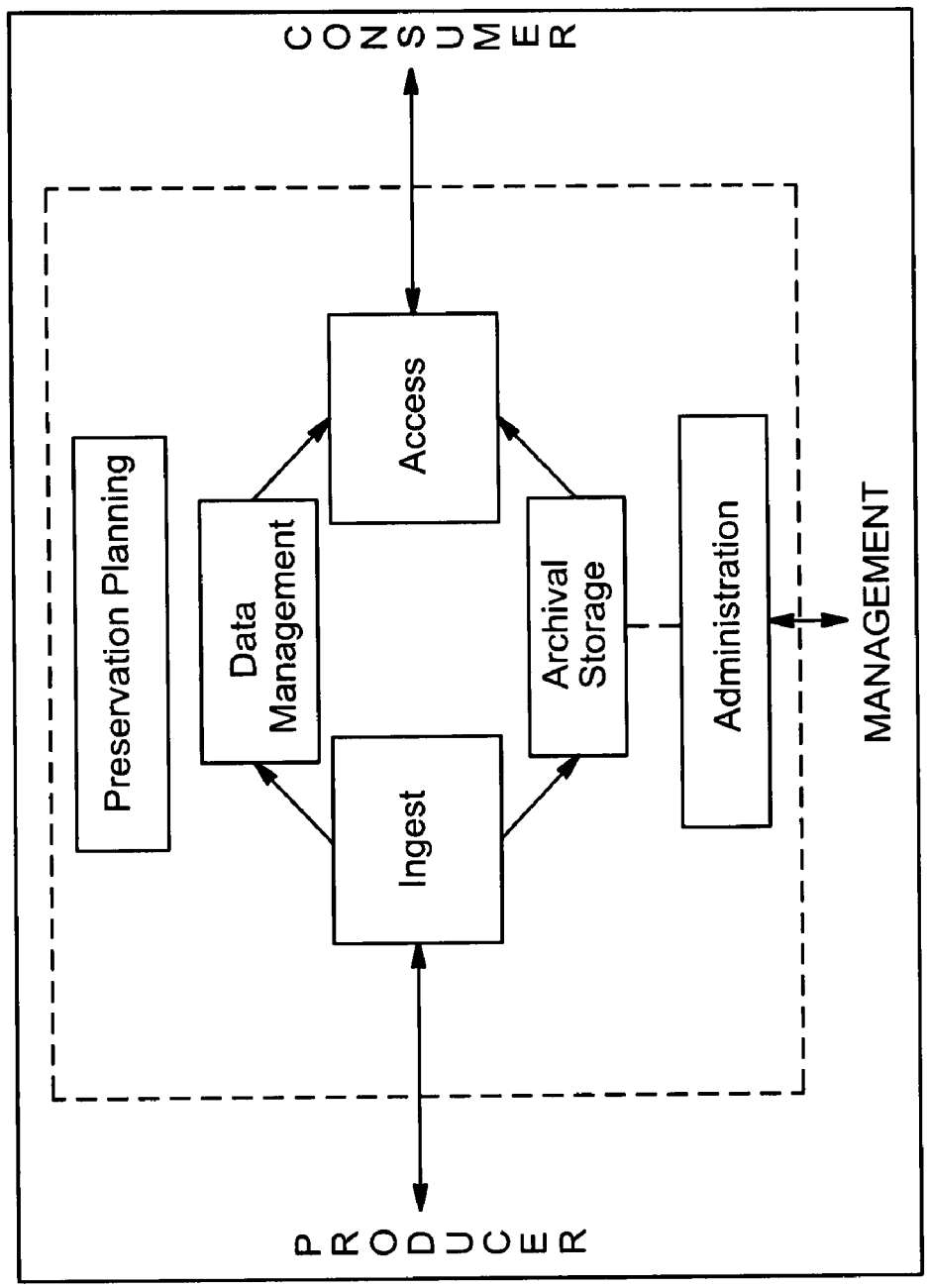
FIG. 1 is a reference model of an overall archives system.
Figure 2:
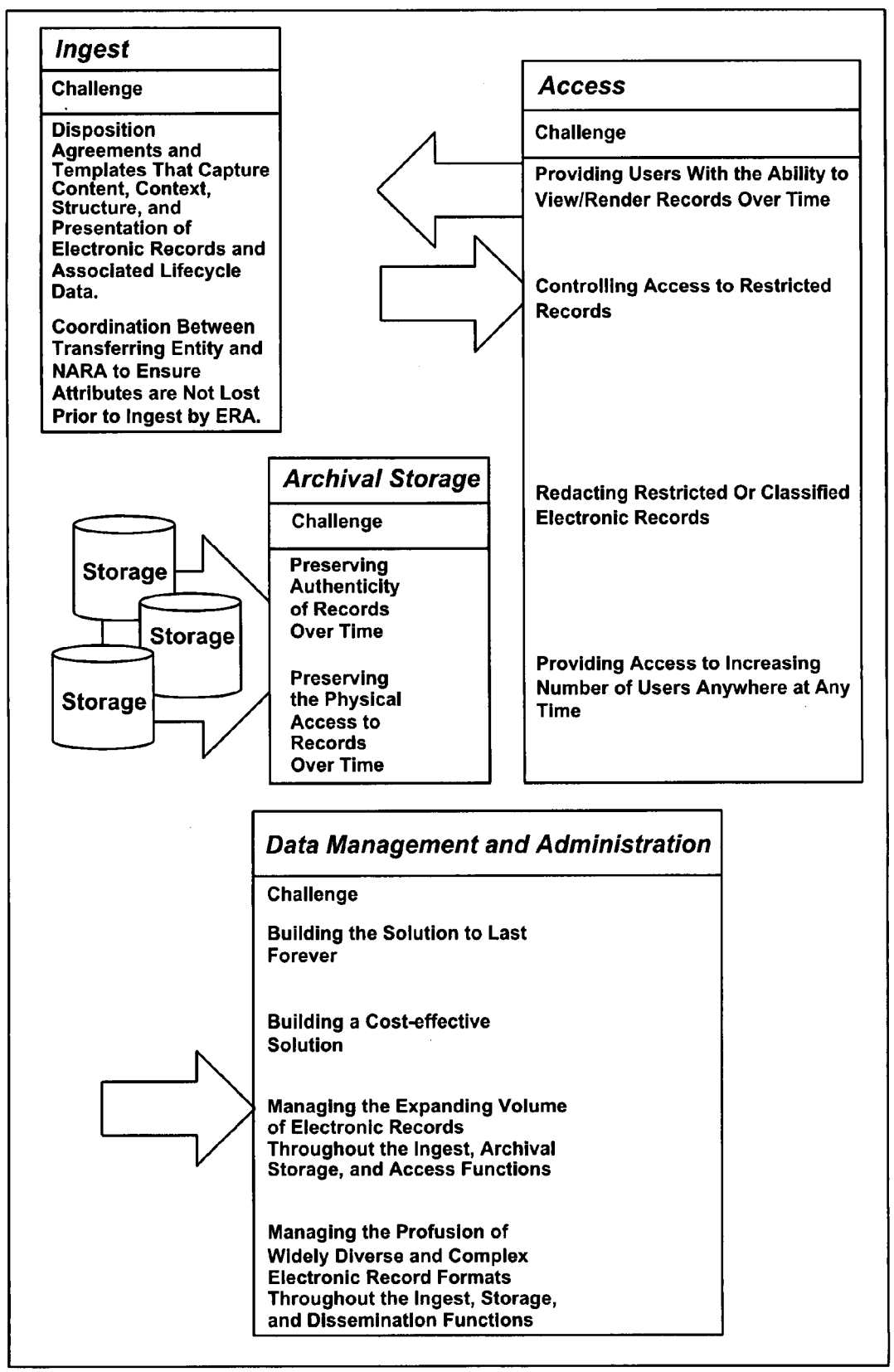
FIG. 2 is a chart demonstrating challenges and solutions related to certain illustrative aspects of the present invention.

As one example, NARA's continuing fulfillment of its mission in the area of electronic records presents new challenges and opportunities, and the embodiments described herein that relate to the ERA and/or authenticity techniques may help NARA fulfill its broadly defined mission. The underlying risk associated with failing to meet these challenges or realizing these opportunities is the loss of evidence that is essential to sustaining a government's or an institution's needs. FIG. 2 relates specific electronic records challenges to the components of the OAIS Reference Model (ingest, archival storage, access, and data management/administration), and summarizes selected relevant research areas.

At Ingest—the ERA needs to identify and capture all components of the record that are necessary for effective storage and dissemination (e.g., content, context, structure, and presentation). This can be especially challenging for records with dynamic content (e.g., websites or databases).

Archival Storage—Recognizing that in the electronic realm the logical record is independent of its media, the four illustrative attributes of the record (e.g., content, context, structure, and presentation) and their associated metadata, still must be preserved "for the life of the Republic."

Access—NARA will not fulfill its mission simply by storing electronic records of archival value. Through the ERA, these records will be used by researchers long after the associated application software, operating system, and hardware all have become obsolete. The ERA also may apply and enforce access restrictions to sensitive information while at the same time ensuring that the public interest is served by consistently removing access restrictions that are no longer required by statute or regulation.

Data Management—The amount of data that needs to be managed in the ERA can be monumental, especially in the context of government agencies like NARA. Presented herewith are embodiments that are truly scalable solutions that can address a range of needs—from a small focused Instance through large Instances. In such embodiments, the system can be scaled easily so that capacity in both storage and processing power is added when required, and not so soon that large excess capacities exist. This will allow the system to be scaled to meet demand and provide for maximum flexibility in cost and performance to the institution (e.g., NARA).

Satisfactorily maintaining authenticity through technology-based transformation and re-representation of records is extremely challenging over time. While there has been significant research about migration of electronic records and the use of persistent formats, there has been no previous attempt to create an ERA solution on the scale required by some institutions such as NARA.

Migrations are potentially loss-full transformations, so techniques are needed to detect and measure any actual loss. The system may reduce the likelihood of such loss by applying statistical sampling, based on human judgment for example, backed up with appropriate software tools, and/or institutionalized in a semi-automatic monitoring process.

Table 1 summarizes the "lessons learned" by the Applicants from experience with migrating different types of records to a Persistent Object Format (POF).

TABLE 1

| Type of record | Current Migration Possibilities |
| --- | --- |
| E-mail | The Dutch Testbed project has shown that e-mail can be successfully migrated to a POF. An XML-based POF was designed by Tessella as part of this work. Because e-mail messages can contain attached files in any format, an e-mail record should be preserved as a series of linked objects: the core message, including header information and message text, and related objects representing attachments. These record relationships are stored in the Record Catalog. Thus, an appropriate preservation strategy can be chosen and applied to each file, according to its type. |
| Word processing documents | Simple documents can be migrated to a POF, although document appearance can be complex and may include record characteristics. Some documents can also include other embedded documents which, like e-mail attachments, can be in any format. Documents can also contain macros that affect "behavior" and are very difficult to deal with generically. Thus, complex documents currently require an enhanced preservation strategy. |

TABLE 1-continued

| Type of record | Current Migration Possibilities |
|---|---|
| | Adobe's Portable Document Format (PDF) often has been treated as a suitable POF for Word documents, as it preserves presentation information and content. The PDF specification is controlled by Adobe, but it is published, and PDF readers are widely available, both from Adobe and from third-parties. ISO, with assistance from NARA, has developed a standard version of PDF specifically designed for archival purposes (PDF/A, see ISO 19005-1). This format has the benefit that it forces some ambiguities in the original to be removed. However, both Adobe and Microsoft are evolving towards using native XML for their document formats. |
| Images | TIFF is a widely accepted open standard format for raster images and is a good candidate in the short to medium term for a POF. For vector images, the XML-based Scalable Vector Graphics format is an attractive option, particularly as it is a Worldwide Web Consortium (W3C) open standard. |
| Databases | The contents of a database should be converted to a POF rather than being maintained in the vendor's proprietary format. Migration of the contents of relational database tables to an XML or flat file format is relatively straightforward. However, in some cases, it is also desirable to represent and/or preserve the structure of the database. In the Dutch Digital Preservation Testbed project, this was achieved using a separate XML document to define the data types of columns, constraints (e.g., whether the data values in a column must be unique), and foreign key relationships, which define the inter-relationships between tables. The Swiss Federal Archives took a similar approach with their SIARD tool, but used SQL statements to define the database structure. Major database software vendors have taken different approaches to implementing the SQL "standard" and add extra non-standard features of their own. This complicates the conversion to a POF. Another difficulty is the Binary Large Object (BLOB) datatype, which presents similar problems to those of e-mail attachments: any type of data can be stored in a BLOB and in many document-oriented databases, the majority of the important or relevant data may be in this form. In this case, separate preservation strategies may be applied according to the type of data held. A further challenge with database preservation is that of preserving not only the data, but the way that the users created and viewed the data. In some cases this may be depend on stored queries and stored procedures forming the database; in others it may depend on external applications interacting with the database. To preserve such "executable" aspects of the database "as a system" is an area of ongoing research. |
| Records with a high degree of "behavioral" properties (e.g., virtual reality models) | For this type of record, it is difficult to separate the content from the application in which it was designed to operate. This makes these records time-consuming to migrate to any format. Emulation is one approach, but this approach is yet to be fully tested in an archival environment. Migration to a POF is another approach, and more research is required into developing templates to support this. |
| Spreadsheets | The Dutch Testbed project examined the preservation of spreadsheets and concluded that an XML-based POF was the best solution, though it did not design the POF in detail. The structured nature of spreadsheet data means that it can be mapped reliably and effectively to an XML format. This approach can account for cell contents, the majority of appearance-related issues (cell formatting, etc), and formulae used to calculate the contents of some cells. The Testbed project did not address how to deal with macros: most spreadsheet software products include a scripting or programming language to allow very complex macros to be developed (e.g., Visual Basic for Applications as part of Microsoft Excel). This allows a spreadsheet file to contain a complex software application in addition to the data it holds. This is an area where further research is necessary, though it probably applies to only a small proportion of archival material. |
| Web sites | Most Web sites include documents in standardized formats (e.g., HTML). However, it should be noted that there are a number of types of HTML documents, and many Web pages will include incorrectly formed HTML that nonetheless will be correctly displayed by current browsers. The structural relationship between the different files in a web-site should be maintained. The fact that most web-sites include external as well as internal links should be managed in designing a POF for web-sites. The boundary of the domain to be archived should be defined and an approach decided on for how to deal with links to files outside of that domain. Many modern web sites are actually applications where the navigation and formatting are generated dynamically from executed pages (e.g., Active Server Pages or Java Server Pages). |

TABLE 1-continued

| Type of record | Current Migration Possibilities |
|---|---|
| | The actual content, including the user's preferences on what content is to be presented, is managed in a database. In this case, there are no simple web pages to archive, as different users may be presented with different material at different times. This situation overlaps with our discussion above of databases and the applications which interact with them. |
| Sound and video | For audio streams, the WAV and AVI formats are the de facto standards and therefore a likely basis for POFs. For video, there are a number of MPEG formats in general use, with varying degrees of compression. While it is desirable that only lossless compression techniques are used for archiving, if a lossy compression was used in the original format it cannot be recaptured in a POF.<br>For video archives in particular, there is the potential for extremely large quantities of material. High quality uncompressed video streams can consume up to 100 GB per hour of video, so storage space is an issue for this record type. |

It is currently not possible to migrate a number of file formats in a way that will be acceptable for archival purposes. One aspect is to encourage the evolution and enhancement of third-party migration software products by providing a framework into which such commercial off-the-shelf (COTS) software products could become part of the ERA if they meet appropriate tests.

When an appropriate POF cannot be identified to reduce the chances of obsolescence, the format may need to be migrated to a non-permanent but more modern, proprietary format (this is known as Enhanced Preservation). Even POFs are not static, since they still need executable software to interpret them, and future POFs may need to be created that have less feature loss than an older format. Thus, the ERA may allow migrated files to be migrated again into a new and more robust format in the future. Through the Dutch Testbed Project, the Applicants have found that it is normally better to return to the original file(s) whenever such a re-migration occurs. Thus, when updating a record, certain example embodiments may revert to an original version of the document and migrate it to a POF accordingly, whereas certain other example embodiments may not be able to migrate the original document (e.g., because it is unavailable, in an unsupported format, etc.) and thus may be able to instead or in addition migrate the already-migrated file. Thus, in certain example embodiments, a new version of a record may be derived from an original version of the record if it is available or, if the original is not available, the new version may be derived from any other already existing derivative version (e.g., of the original). As such, an extensible POF for certain example embodiments may be provided.

In view of the above aspects of the OAIS Reference Model, the ERA may comprise an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record. The storage module may include structure and/or a program to preserve authenticity of the record over time, and/or to preserve the physical access to the record or file over time. The access module may include structure or a program to provide a user with ability to view/render the record or file over time, to control access to restricted records, to redact restricted or classified records, and/or to provide access to an increasing number of users anywhere at any time.

Figure 3:
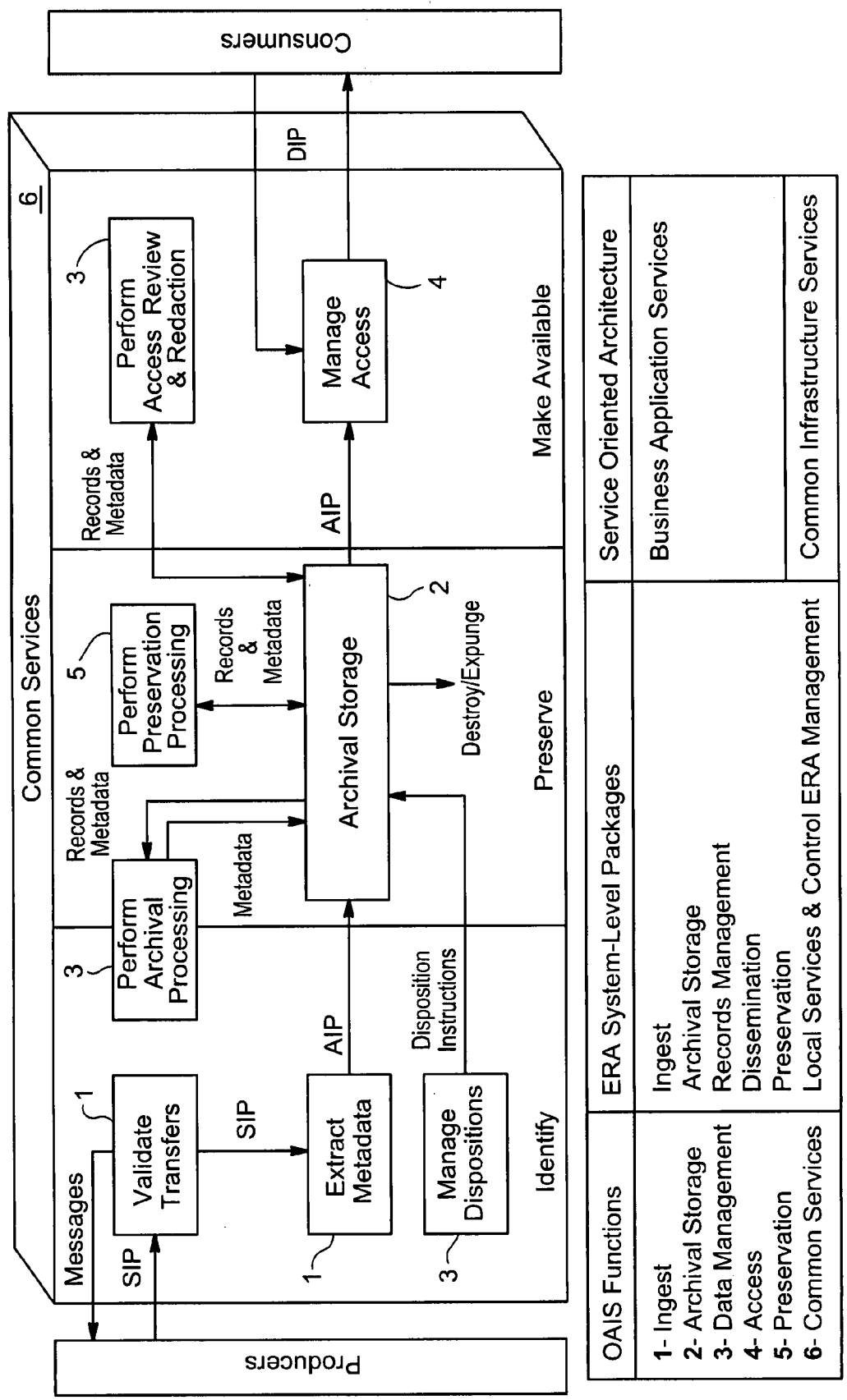
FIG. 3 illustrates the notional lifecycle of records as they move through the ERA system, in accordance with an example embodiment.

FIG. 3 illustrates the notional lifecycle of records as they move through the ERA system, in accordance with an example embodiment. Records flow from producers, who are persons or client systems that provide the information to be preserved, and end up with consumers, who are persons or client systems that interact with the ERA to find preserved information of interest and to access that information in detail. The Producer also may be a "Transferring Entity."

During the "Identify" stage, producers and archivists develop a Disposition Agreement to cover records. This Disposition Agreement contains disposition instructions, and also a related Preservation and Service Plan. Producers submit records to the ERA System in a Submission Information Package (SIP). The transfer occurs under a pre-defined Disposition Agreement and Transfer Agreement. The ERA System validates the transferred SIP by scanning for viruses, ensuring the security access restrictions are appropriate, and checking the records against templates. The ERA System informs the Producer of any potential problems, and extracts metadata (including descriptive data, described in greater detail below), creates an Archival Information Package (or AIP, also described in greater detail below), and places the AIP into Archival Storage. At any time after the AIP has been placed into Archival Storage, archivists may perform Archival Processing, which includes developing arrangement, description, finding aids, and other metadata. These tasks will be assigned to archivists based on relevant policies, business rules, and management discretion. Archival processing supplements the Preservation Description Information metadata in the archives.

At any time after the AIP has been placed into Managed Storage (also sometimes called Archival Storage), archivists may perform Preservation Processing, which includes transforming the records to authentically preserve them. Policies, business rules, Preservation and Service Plans, and management discretion will drive these tasks. Preservation processing supplements the Preservation Description Information metadata in the archives, and produces new (transformed) record versions.

With respect to the "Make Available" phase, at any time after the AIP has been placed into Archival Storage, archivists may perform Access Review and Redaction, which includes performing mediated searches, verifying the classification of records, and coordinating redaction of records where necessary. These tasks will be driven by policies, business rules, and access requests. Access Review and Redaction supplement the Preservation Description Information metadata in the archives, and produces new (redacted) record versions. Also, at any time after the AIP has been placed into Managed Storage, Consumers may search the archives to find records of interest.

Figure 4:
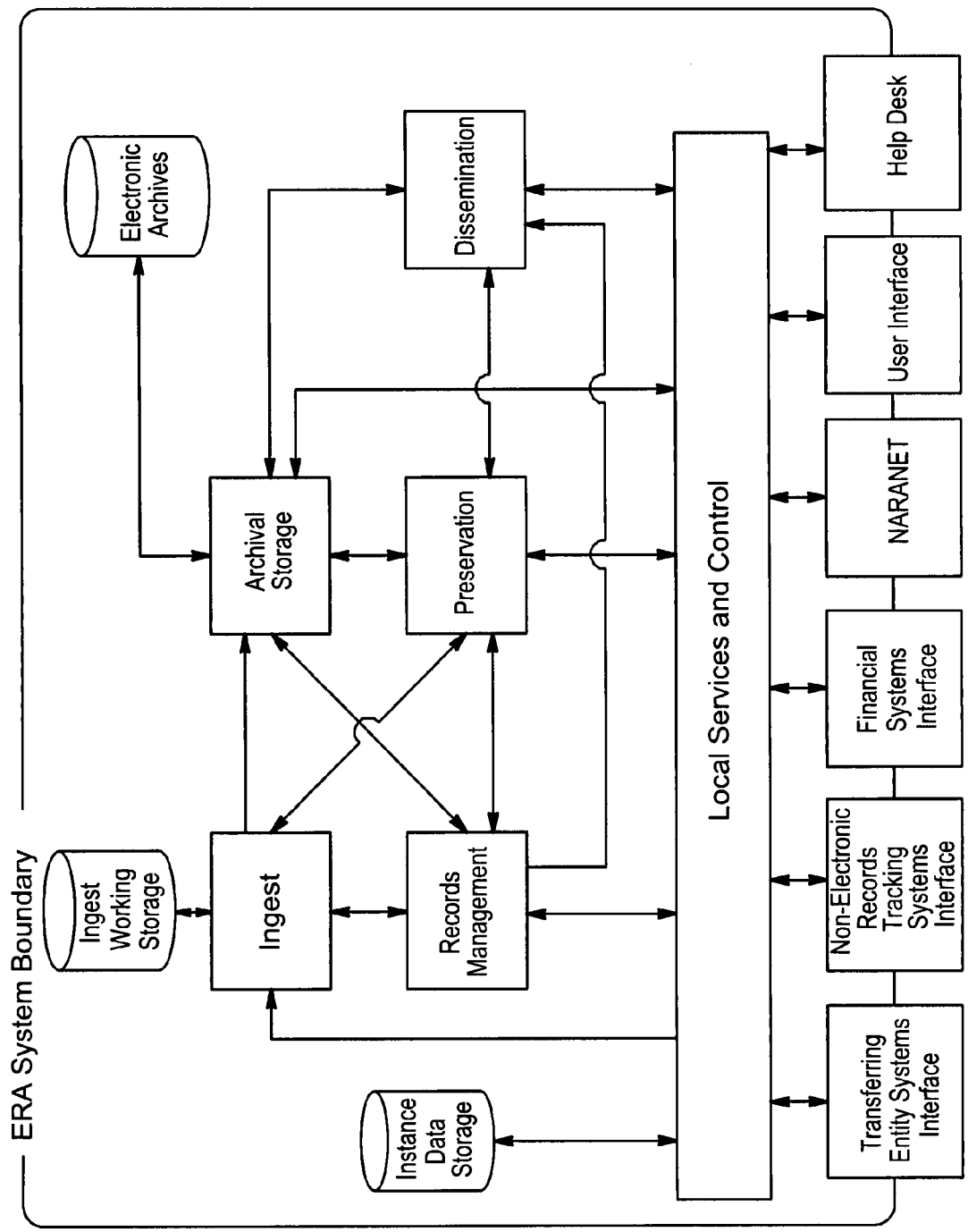
FIG. 4 illustrates the ERA System Functional Architecture from a notional perspective, delineating the system-level packages and external system entities, in accordance with an example embodiment.

FIG. 4 illustrates the ERA System Functional Architecture from a notional perspective, delineating the system-level packages and external system entities, in accordance with an example embodiment. The rectangular boxes within the ERA System boundary represent the six system-level packages. The ingest system-level package includes the means and mechanisms to receive the electronic records from the transferring entities and prepares those electronic records for storage within the ERA System, while the records management system-level package includes the services necessary to manage the archival properties and attributes of the electronic records and other assets within the ERA System as well as providing the ability to create and manage new versions of those assets. Records Management includes the management functionality for disposition agreements, disposition instructions, appraisal, transfer agreements, templates, authority sources, records lifecycle data, descriptions, and arrangements. In addition, access review, redaction, selected archival management tasks for non-electronic records, such as the scheduling and appraisal functions are also included within the Records Management service.

The Preservation system-level package includes the services necessary to manage the preservation of the electronic records to ensure their continued existence, accessibility, and authenticity over time. The Preservation system-level service also provides the management functionality for preservation assessments, Preservation and Service Level plans, authenticity assessment and digital adaptation of electronic records. The Archival Storage system-level package includes the functionality to abstract the details of mass storage from the rest of the system. This abstraction allows this service to be appropriately scaled as well as allow new technology to be introduced independent of the other system-level services according to business requirements. The Dissemination system-level package includes the functionality to manage search and access requests for assets within the ERA System. Users have the capability to generate search criteria, execute searches, view search results, and select assets for output or presentation. The architecture provides a framework to enable the use of multiple search engines offering a rich choice of searching capabilities across assets and their contents.

The Local Services and Control (LS&C) system-level package includes the functional infrastructure for the ERA Instance including a user interface portal, user workflow, security services, external interfaces to the archiving entity and other entities' systems, as well as the interfaces between ERA Instances. All external interfaces are depicted as flowing through LS&C, although the present invention is not so limited.

The ERA System contains a centralized monitoring and management capability called ERA Management. The ERA Management hardware and/or software may be located at an ERA site. The Systems Operations Center (SOC) provides the system and security administrators with access to the ERA management Virtual Local Area Network. Each SOC manages one or more Federations of Instances based on the classification of the information contained in the Federation.

Also shown are the three primary data stores for each Instance:

1. Ingest Working Storage—Contains transfers that remain until they are verified and placed into the Electronic Archives;
2. Electronic Archives—Contains all assets (e.g., disposition agreements, records, templates, descriptions, authority sources, arrangements, etc.); and
3. Instance Data Storage—Contains a performance cache of all business assets, operational data and the ERA asset catalog.

Figure 5:
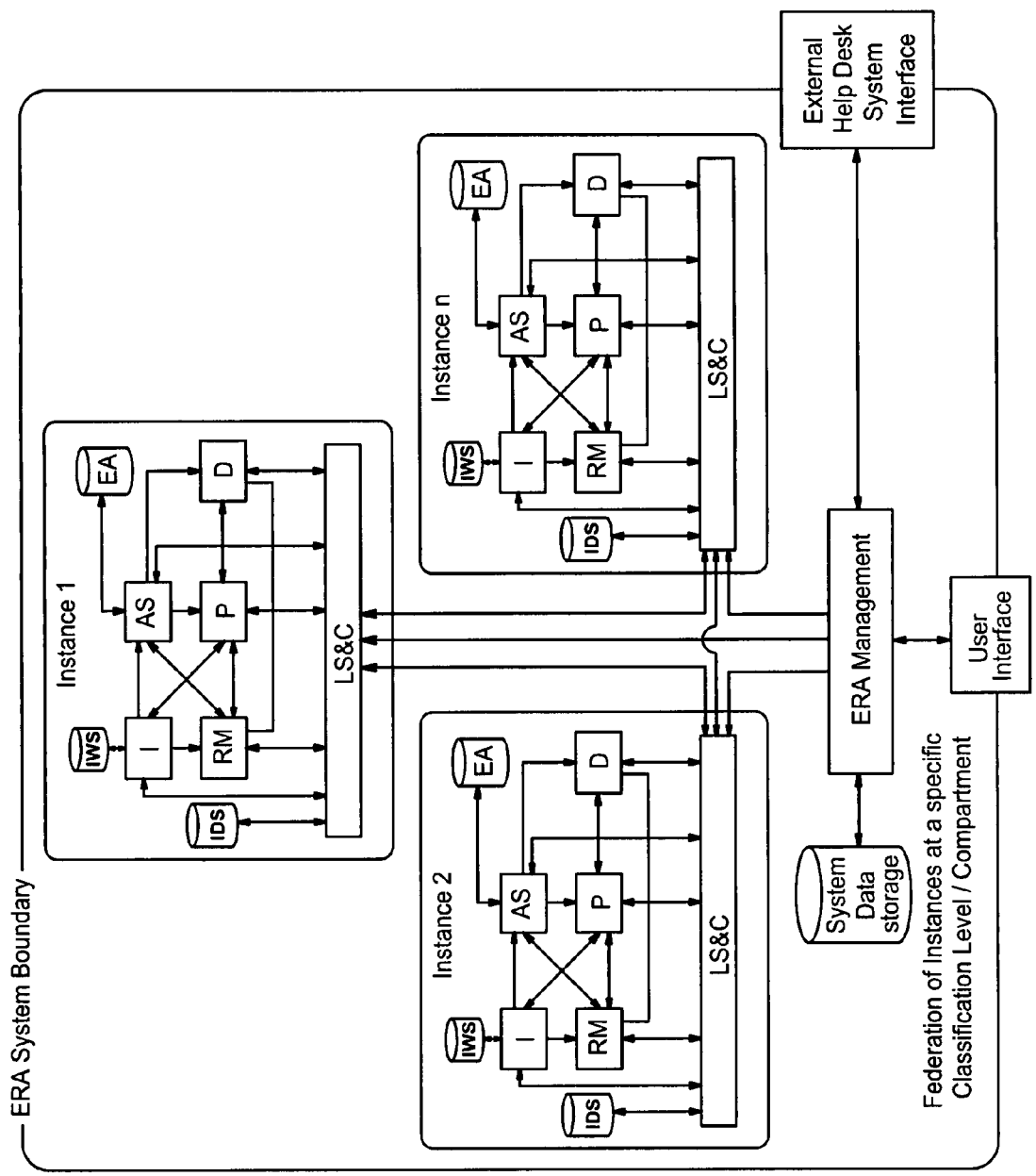
FIG. 5 is a federation of ERA instances, in accordance with an example embodiment.

This diagram provides a representative illustration of how a federated ERA system can be put together, though it will be appreciated that the same is given by way of example and without limitation. Also, the diagram describes a collection of Instances at the same security classification level and compartment that can communicate electronically via a Wide Area Network (WAN) with one another, although the present invention is not so limited. For example, FIG. 5 is a federation of ERA instances, in accordance with an example embodiment. The federation approach is described in greater detail below, although it is important to note here that the ERA and/or the asset catalog may be structured to work with and/or enable a federated approach.

The ERA's components may be structured to receive, manage, and process a large number of assets and collections of assets. Because of the large number of assets and collections of assets, it would be advantageous to provide an approach that scales to accommodate the same. Beyond the storage of the assets themselves, a way of understanding, accessing, and managing the assets may be provided to add meaning and functionality to the broader ERA. To serve these and/or other ends, an asset catalog including related, enabling features may be provided.

In particular, to address the overall problems of scaling and longevity, the asset catalog and storage system federator may address the following underlying problems, alone or in various combinations:

Capturing business objects that relate to assets that are particular to the application storing the assets (e.g., in an archiving system, such business objects may include, for example, disposition and destruction information, receipt information, legal transfer information, appraisals and archives description, etc.), with each new business use of the design potentially defining unique business objects that are needed to control its assets and execute its business processes;

Maintaining arbitrary asset attributes to be flexible in accommodating unknown future attributes;

Employing asset and other identifiers that are immutable so that they remain useful indefinitely and, therefore, enable them to be referenced both within the archives and by external entities with a reduced concern for changes over time;

Supporting search and navigation through the extreme scale and diversity of assets archived;

Handling obsolescence of assets that develops over time;

Accommodating redacted and other derivative versions of assets appropriate for an archives system;

Federating (e.g., integrate independent parts to create a larger whole) multiple, potentially heterogeneous, distributed, and independent archives systems (e.g., instances) to provide a larger scale archives system;

Supporting a distributed implementation necessary for scaling, site independence, and disaster recovery considerations where the distribution of assets and associated catalogs may change over time but remain visible to all sites;

Employing a search architecture and catalog format that allow exploitation of multiple, possibly commercial search engines for differing asset data types and across instances of archives in a federation, as future needs may dictate;

Accommodating multiple, heterogeneous, commercial storage subsystems among and within the instances in a federation of archives to achieve extreme scaling and adapt to changes over time;

Supporting a variety of data handling requirements based on, for example, security level, handling restrictions and ownership, in a manner that performs well and remains manageable for an extremely large number of assets and catalog entries;

Supporting storage of any kind of electronic asset;

Supporting transparent data location and migration and storage subsystem upgrades/changes; and/or Supporting reconstruction of the catalog and archives with little or no information other than the original catalog and archived bit streams (e.g., for the purposes of disaster recovery).

It will be appreciated that these and/or other components described herein may be provided in any number of different combinations of hardware and/or software components, architectures, subsystems, or the like. Indeed, any suitable form of programmed logic circuitry including one or both of hardware and/or software may be used in certain example embodiments.

2. Understanding Authenticity 2.1 Authenticity in General

One way to address the preservation challenge is to break it down into three components: lessons learned from preserving authentic analog records, technical aspects of preserving digital objects, and intellectual aspects of preserving authentic digital records.

2.1.1 Preserving Authentic Analog Records

It has been noted that assessments of authenticity in the world of paper and other stable, physical media rely heavily on the existence of enduring physical objects. This stability enables at least three strategies for assessing authenticity:

Trace the history (e.g., the "extended existence in time") of the record or physical object;

If the object is "one of many" (such as a member of an edition), compare it with another copy, a reference copy; and, If something is transient (such as a performance of a play), make use of a stable reference object (such as the script).

Large-scale bureaucratic organizations evolved during the nineteenth century and continue to the present day. Because they are ongoing entities, bureaucracies had to develop a system for determining the "truth-value" of records that were created previously. For a bureaucracy to function, its members must be able to rely on records of events for which they have no personal knowledge.

Heather MacNeil has outlined two ways bureaucracies and bureaucrats determine the truth-value of records:

1. Assess the reliability of records indirectly by focusing on the reliability of record-makers and record-keepers.
2. Compensate for their non-participation in the events the records report by conceiving of the record itself as the event.

Various constituents may need to be convinced about the authenticity of the digital records stored in the system. If principles and approaches that have been developed over time for analog records can be adapted, the resulting embodiments may increase the comfort level of constituents and customers.

Thus, several authenticity approaches from the analog environment may be considered for certain example embodiments:

Documenting the provenance and full history of the record;

Comparing the record to another (reference) copy;

Comparing the record to a "script";

Establishing and monitoring procedural and technical controls over the records; and/or Comparing the records to organizational standards for authentic records;

2.1.2 Preserving Digital Objects

Once considered the greatest challenge because of the fragility of physical media, the technical aspects of preserving digital objects now are well understood. As noted previously, meeting technical requirements is necessary but not sufficient for preserving authentic records. For example, to preserve digital objects, it should be possible to verify that the information system: stores the right data properly, protects the stored data from alteration or change, retrieves all the right data and only the right data from storage, subjects the retrieved data to an appropriate process, executes the process correctly, etc.

The nature of the digital object, or "digital informational entity," being preserved includes a single, composite bit stream, the bit stream representing the core content of the entity (e.g., the encoding of a document, data, or a record), including all structural information required to constitute the entity from its various components, wherever and however it may be represented. Component bit streams may represent all necessary contextual or ancillary information needed to make the entity meaningful and usable. Each component of the bit stream may be verified in the five technical areas outlined above.

2.1.3 Preserving Authentic Digital Records

There is a growing consensus that authenticity of records is a judgment—a continuum—rather than a binary, yes-or-no choice. Two of the major claims involve establishing the identity of the records and demonstrating their integrity. Identity refers to the attributes of a record that uniquely characterize it and distinguish it from other records. The identity of a record refers to its provenance, author, addressee, writer, date, action or matter, and archival bond (relationship to other records). Integrity of a record refers to its soundness (e.g., its condition is unimpaired) and completeness (e.g., it possesses all the necessary parts).

These factors raise questions regarding what constitutes the "essence" of a record, or a record's "necessary parts." For example, there are some components of a record that can be lost without compromising its substance and the ability to verify its authenticity over time, and there are other components of a record, the loss of which would be equivalent to the loss of the record. Some examples of the latter may include the color in a map or columns in a table.

Certain example embodiments may follow four steps given the above. First, identify for each type of electronic record produced by an organization the components that ensure its authenticity over time. Second, assess whether those components that are not visible to the user can be made visible and stabilized by linking them inextricably to the intellectual form of the record. Third, determine whether, in the cases in which the component could not be made visible and stabilized, it would be possible and advisable to move the records in question to a non-digital form (e.g., microfilm). Fourth, adopt self-authenticating and well-documented procedures for migration and an uninterrupted line of physical custody.

There are a number of "boundary conditions," which may include situations or contexts with identifiable risks of changing the records. Some examples include processing (e.g., any processing entails some risk that the records will be altered), migration (e.g., there are risks whenever a technological dependency is altered or removed or the technology itself is changed), and changing physical and/or legal custody (e.g., risks are present whenever records change custody).

Therefore, during any migration or transformation, an archives system may need to make certain that the essential components of the record are not compromised. The authenticity of a preserved electronic record can be certified only if an archives system can show that none of the specific authenticity requirements applicable to the record were violated.

2.2 Illustrative Approach to Demonstrating, Asserting, and/or Providing Authenticity 2.2.1 Introduction and Assumptions As noted above, authenticity is a judgment that involves levels of certitude rather than a binary yes/no decision. Authenticity applies to records and aggregates of records, not to bit streams; it is a determination about conceptual objects, not logical or physical objects. Preserving accurate bit streams is necessary but not sufficient for preserving authentic records. Authenticity involves policy decisions that are likely to be tested by the courts; thus, the archives system may be flexible enough to permit implementation of different policies for authenticity now and in the future. The original bit stream received from the institution or donor may be preserved in an unaltered form. The bit stream in itself does not constitute the authentic record. The approach of certain example embodiments for maintaining the conceptual record may involve transforming the information to a different bit stream. It will be appreciated that authenticity can be strengthened or weakened by users or system actions. This includes the transferring institution or donor, record administrators, archivists, and/or the system services.

2.2.2 Steps for Demonstrating, Asserting, and/or Providing Authenticity of Assets The approach for preserving authentic digital records may be broken down into five steps or components in certain example embodiments:

1. The archives system may receive reliable digital records from institutions, such as federal agencies or other donors.
2. As part of the templates for records, the archives system may develop default authenticity requirements for different type of records.
3. Prior to ingest of a particular body of records, the archives system may develop a Preservation and Service Plan that either accepts or modifies the default authenticity requirements.
4. Throughout the rest of the records' lifecycle after ingest, the archives system may preserve an accurate bit stream.
5. Throughout the rest of the records' lifecycle after ingest, the archives system may be able to produce copies of the digital record (and associated metadata) that can be used to judge the continuing authenticity of the records. Although ultimately an archivist must judge authenticity, the archives system's large volume of records will require computer-implemented methods to check specific features of the record that give an indication of authenticity. Human assessment also could be applied to sampled records as part of a quality control process.

Details for Each of These Steps Follows.

2.2.2.1 Step 1: Reliable Digital Records

As defined above, "reliability" is a factor of the creation and maintenance of the records by the originating institution. As such, reliability ultimately may be outside the scope of the archives system. Nevertheless, the archives system may address reliability because it will be of long-term interest to users.

For example, there are a number of policy options for the administrator of an archives system in the area of reliability, such as:

Excluding reliability as a factor when accepting records for ingest.

Requiring originating agencies submitting records to certify the reliability of their own records before they are accepted for ingest.

Establishing reliability requirements for agency records and have the archives system certify agency compliance before accepting records for ingest.

While the archives system will be flexible enough to implement these or other policy decisions about reliability, any one option may be selected as the default. For example, as a step in the ingest process, originating institution or donors may be required to certify the reliability of the records.

2.2.2.2 Step 2: Default Authenticity Requirements

Default records templates may be indicative of policy options for defining authenticity requirements. Authenticity statements and strategies may be based on and/or relate to, for example, provenance, audit trail, completeness, metadata, normative copy, digital recipe, suitability for purpose, and/or the like.

With respect to provenance, complex digital objects may require maintenance of unbroken provenance relationships among components of the object. The archives system therefore may capture all available source(s) and/or provenance information about the record and its digital components at the time of ingest. The archives system also may maintain an unbroken provenance for the records after ingest.

Audit trails may indicate the series of transformations that has brought a particular document to the desktop, and such a trail ultimately may lead back to the creation of the initial document (or at least back to a version that we had independent reasons to trust as authentic). The archives system may have the capability to capture information about interactions with and changes to a record, to ensure that an audit trail exists. A predetermined policy may indicate what should be captured as part of the audit trail.

Completeness of records is another concern. Accordingly, a policy regarding incomplete records (or aggregates of records) presented for ingest may be established. Among the options are to ingest records that are known to be incomplete and document this fact, refuse to accept incomplete records, etc. To this end, the components of a record (or aggregate of records) either before or at the time of ingest may be defined. The archives system may be able to capture these components at ingest and/or demonstrate at any time in the future that the records remains complete.

Metadata may begin by documenting the content, structure, context, presentation, and/or behavior of the record. The metadata also may include documentation for any changes or transformations made to the records. Ultimately, using metadata as part of an authenticity approach may mean being able to compare a record to what its metadata says it should be. There are at least two specific metadata elements that can be considered for an authenticity policy: a unique identifier (e.g., each record may have a persistent unique identifier that can be used to distinguish it from other records) and a digital hash (e.g., the archives system may generate a digital hash for each record and, as part of the records catalog, this hash may be used to identify potential duplicate records). The hash algorithm also may be re-generated at any time to verify that the record in question matches the original hash value captured in metadata.

One authenticity approach involves comparing an object in question to a known "reference object" or "normative copy." Comparing an object in question to a normative copy is easy to do with editions of a book, but more challenging with digital records. One approach for digital records is to create and capture a normative copy at ingest for future comparison. In an embodiment, this might work as follows:

Determine if a normative copy should be created and captured for each record or aggregation of records. The normative copy might be a sample record that represents the entire aggregate of records.

Determine the type of normative copy to be created and captured. For example, a static TIFF file could be created at ingest to document the presentation of a webpage.

Implement the policy by creating and ingesting the normative copy

In the future, a version of a record always could be compared to the TIFF normative copy captured at ingest.

Creating a normative copy, however, adds complexity: The problems of preserving the normative copy are the same as those of preserving the digital records themselves. A record is a conceptual object, requiring software and hardware to process the bit stream. If it were straightforward to preserve in working condition the original software for the "normative copy," then the whole digital preservation issue would be much simpler. In one embodiment, a normative copy of a digital record may be created at ingest and may be made available for comparison throughout the rest of the lifecycle.

A "digital recipe" or set of instructions when making presentations about persistent preservation may be implemented. The original object might be preserved by breaking it into its component parts, and storing the parts and the assembly instructions in a human-readable container. To this end, the electronics archives may preserve a set of metadata instructions (e.g., a digital script) for recreating the digital record.

Authenticity may be determined, in part, by suitability for some purpose. A "suitability strategy" that uses various tactics to specify and test whether an informational entity fulfills a given range or purposes or uses may be implemented. Rothenberg's "suitability strategy" has two steps:

Establish authenticity principles for various domains or disciplines that will make it possible to define authenticity in functional terms from the expected range of uses. For example, the following sequence of decreasingly stringent principles is stated in terms of the relationship between a preserved digital informational entity and its original instantiation: same for all intents and purposes, same functionality and relationships to other informational entities, same "look and feel," same content (for any definition of the term), same description, etc.

Derive a set of authenticity criteria (from each authenticity principle) to serve both as generators for specific preservation requirements and as conceptual and practical tests of the success of specific preservation techniques.

(See Jeff Rothenberg, "Preserving Authentic Digital Information." Pages 51-68 in "Authenticity in a Digital Environment." May 2000. Council on Library and Information Resources. Available at: www.clir.org/pubs/abstract/pub92abst.html.)

The archives system may permit the definition of principles and criteria related to suitability for purpose. Any subsequent output from the archives system then may be assessed against the suitability of purpose criteria.

2.2.2.3 Step 3: Ingest and Preparation of Preservation and Service Plan

Prior to ingest, an archivist may first decide which reliability policy option to apply to the specific records (optionally excluding reliability as a factor, requiring the institution to certify the reliability of the records, establishing reliability requirements for institution records and having institution compliance certified before accepting records for ingest, etc). The archivist may then review the default authenticity requirements for the records and modify the requirements, if necessary. Finally, the archivist may prepare the Preservation and Service Plan that includes future assessments of the authenticity of the records periodically or on an ad-hoc basis.

2.2.2.4 Step 4: Accurate Bit Stream

As a condition for the authenticity of the records, the archives system may accurately preserve the bit streams ingested into it, for both content and metadata. This technical preservation may use standard information processing techniques (such as, for example, hash algorithms) to demonstrate that the bit stream remains complete.

2.2.2.5 Step 5: Authentic Copies of Records

At any point during the lifecycle of the record, an archivist may be able to create a copy of a digital record from the archives system and compare this output to the original (or subsequent) authenticity requirements as specified in the Preservation and Service Plan. On the basis of this comparison, the archivist may be able to "authenticate" and/or "certify" the copy.

3. Example Implementations of Authenticity

This section identifies several illustrative components for establishing authentic electronic records. Of course, it will be appreciated that such components are provided by way of example and without limitation. Moreover, the components may be combined in various combinations and sub-combinations to achieve yet further embodiments.

3.1 Components of Authenticity

Establishing authenticity involves two related sets of components. The first set defines a record. Archival theory states that records have three fundamental aspects: content, structure, and context. In the Society of American Archivists (SAA) Glossary of Archival Terminology, the terms are defined as follows:

1. Content is the intellectual substance of a document, including text, data, symbols, numerals, images and sound.
2. Structure is the manner in which elements are organized, interrelated and displayed.
3. Context is the organizational, functional and operational circumstances surrounding materials' creation, receipt, storage or use and its relationship to other materials.

There is also a set of components relating to the ability to assess authenticity of electronic records as their physical and digital manifestation changes over time. This includes three components:

4. Essential Characteristics are defined as those properties/characteristics of electronic records that must remain unchanged through transfer, ingest, storage and presentation or output of records.
5. Provenance is defined by SAA as "the origin or source of something: information regarding the origins, custody and ownership of an item of collection." Provenance maintains custodial history including any processing on digital files that hold record material.

6. Integrity ensures the bit level integrity of data files and the relationships between groups of digital files that, in aggregate, hold record material.

Each of these components and subcomponents will now be discussed in greater detail.

Content, in this case, signifies the information or meaning conveyed by a record. Mechanisms may be in place to ensure that the information and meanings are not lost. Preserving record lifecycle data including the original order helps to convey the meaning of the records.

The structure of a record within the archival context identifies the relationships between the documentary materials, files or items that constitute a record. Maintaining the structure of records has been recognized as providing for their understanding and value, and therefore to their authenticity. In the electronic sphere, this presents new challenges because the relationships between data files may define the informational content in the record. For the duration of a record's life within ERA, for example, two levels of structure may be maintained—the structure of records and the structure of data files. The structure of records based on a classical hierarchy of Record Group/Series/File Unit/Item may be used to capture records structure. This may help to support the archival bond. The data files structure may also be captured as an adjunct to preserving the content of records.

The SAA defines context in general as "the organizational, functional, and operational circumstances surrounding materials' creation, receipt, storage, or use, and its relationship to other materials." The context relates to the environment in which records were created and used. The ability to place records in their context helps to convey understanding pertaining to their meaning and importance. Both context in general and also specifically as it relates to encoded archival context may be monitored. From an implementation perspective, encoded archival context is a Document Type Definition (DTD) that is compatible with use of XML and extends the creation of encoded archival description.

The term "essential characteristics" is used two ways in the archival community with respect to electronic records. The first is to enumerate the necessary conditions to establish authenticity based on the records within the archives, and the second is to identify those aspects of the representation of the electronic record that must be preserved to preserve information and meaning. When used in this context, it is important to note that essential characteristics are assigned to record types and not to the records themselves. A record that is of a certain record type will have a certain set of essential characteristics associated to it that may be preserved. Essential characteristics also may be ensured at the record aggregate level (e.g., such as at a record series and not just at the record type level). The archives system may need to be able to capture record types, determine the correct essential characteristics for the records type, and associate the characteristics with the records. As records are transformed over time, for example, a transformation into a more persistent format, the essential characteristics of the record must be preserved.

The provenance of a record refers to its origin, chain of custody, and its custodial history. If the provenance of a bit-stream is in doubt, its value as a record, and therefore its authenticity, may be invalidated. For an electronic record within an archives system, the meaning of provenance may be extended to include not only the origin of the data files and their custodial history, but also the history of all actions taken on those data files. This includes making different electronic versions which may be the basis for a representation of the records in future.

Integrity includes fixity and provides the assurance that the digital item has not been modified. Fixity of records ensures the stability of the files in the archives by checking that a file is what it purports to be, and that it has not been corrupted over time. Fixity, validation, and virus checks are all part of the process to ensure the data integrity of the bit-stream. While the original bit-level manifestations will not change, presentation of the bit level manifestations may change. This means information about the transformations also may need to be captured. The concept of integrity then may have to extend beyond the bit-level integrity of the data files put into the archives. Integrity of electronic records archives systems includes capturing and maintaining in a reliable manner, all the derivations from the original data files and the nature of the processing that created the derivation. This may help to ensure that processes that had been approved for the purpose of archival preservation were applied to the data files.

Integrity also may be further strengthened by overall system credibility, specifically the standard system processes and procedures used to process files and records, along with Information Assurance principles followed by the system.

3.2 Exemplary Support Structure for Authenticity

Figure 6:
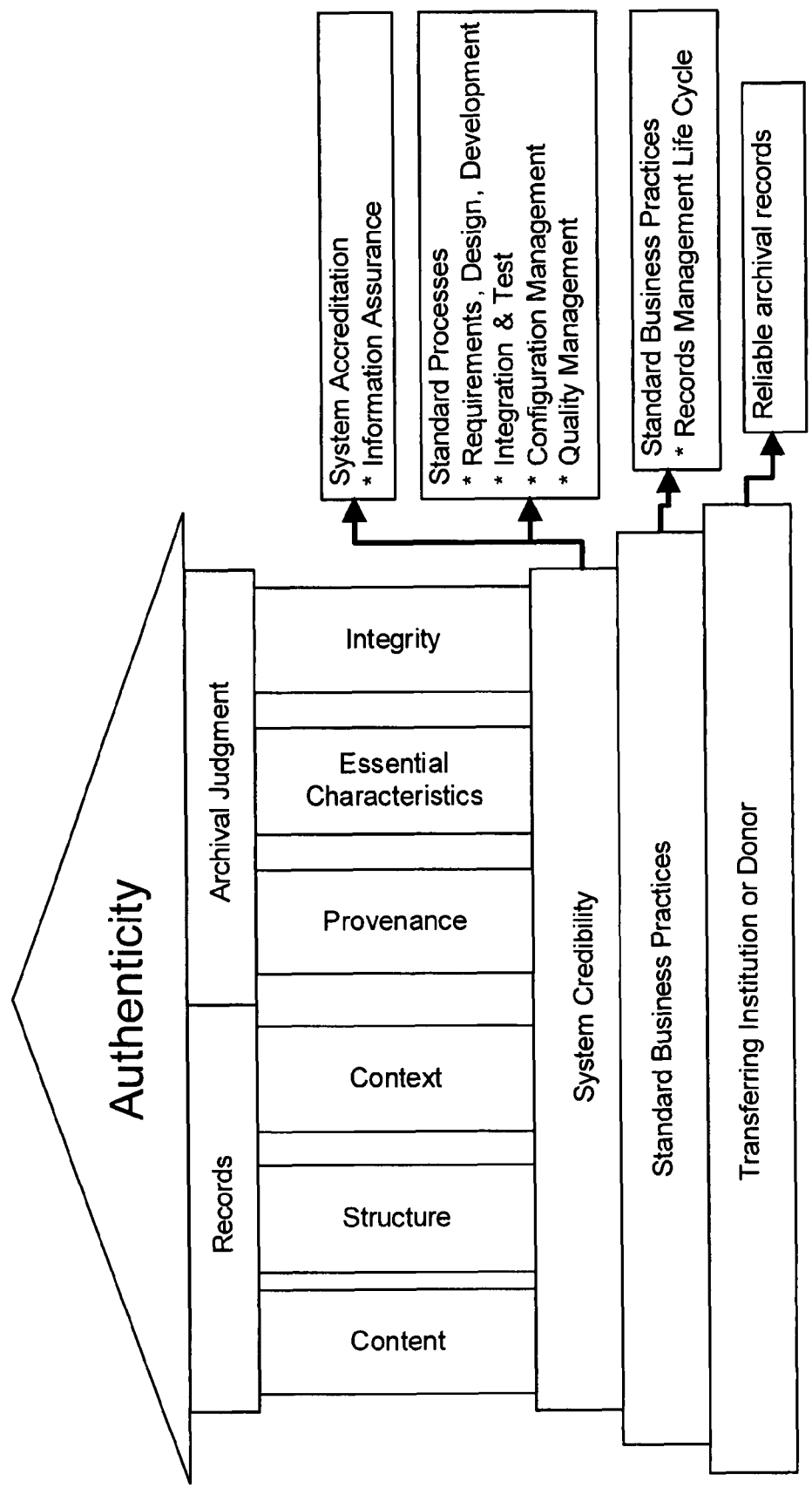
FIG. 6 is an illustrative support structure model that provides an exemplary pictorial view of the elements useful for establishing authenticity for the electronic records archives system, in accordance with an example embodiment.

FIG. 6 is an illustrative support structure model that provides an exemplary pictorial view of the elements useful for establishing authenticity for the electronic records archives system, in accordance with an example embodiment. This structure may help provide elements that will enable the archives system to establish and maintain the authenticity of records within its archive. It will be appreciated that the following elements may be used alone or in various combinations. In particular:

Transferring Institution or Donor—provides reliable records that are set for transfer using the ingest process.

Standard Business Practices—provide the foundation for managing records throughout their lifecycle System Credibility—includes the design and development of the archives system based upon custom and/or industry standard processes and procedures that govern one or more of the following: requirements, design and development; integration and test; configuration management; and quality assurance management. System credibility may also be predicated on the implementation of information assurance controls and the receipt of system "authorization to operate" based on the completion of Certification and Accreditation.

Components Related to Records and Archival Judgment are represented as grouped pillars and include components of:

Records that include: content, structure, and context; and

Archival judgment of the records that includes: provenance, essential characteristics, and integrity.

Authenticity—is a judgment that involves levels of certitude and is based on the foundational layers that lie beneath.

3.3 Implementing Authenticity

Given the above support structure model, the issue becomes how to implement authenticity of records within the archives system. The layered approach identifies a method to achieve a degree of confidence as to the levels of certitude of authenticity. Within the ERA system, for example, a balance of human and manual operations is conducted along with high speed system processes to ensure that a large set of records are archived. If the support structure model is analyzed, to attest to the authenticity of records, the entire archives system has to be credible. This means that risk should not be assessed just at individual processes or for archival users or records administrators. Instead, the entire system may be held accountable for proving the authenticity of a particular record.

The following sections spell out the "what" and the "how" of certain example implementations. The sections include:

1. Transfer from External Entity: this section addresses the lowest layer of the archives system support structure model that ensures that reliable records are sent from transferring institutions and they undergo a systematic ingest process. Each of the steps within the ingest process is identified to illustrate how authenticity components are addressed.
2. Standard Process for Electronic Archives: this section addresses several exemplary standard business processes and the ability to implement this process within the context of electronic records for long term preservation. A lifecycle view of authenticity is presented that ensures that each component of authenticity is defined and how these principles are implemented.
3. Archives System Credibility: this section addresses the archives system and the standard processes used for system development. Its description includes information assurance principles that ensure system accreditation and test verification to ensure that authenticity components are implemented. It then addresses the pillars of the support structure by presenting how the archives system addresses each authenticity component based on the lifecycle view.

It will be appreciated that the techniques disclosed in the following sections may be used individually or in various combinations.

3.4 Example Implementation for Transfer from External Entity

This section provides a description of how reliability of records may be maintained as electronic records are transferred from the transferring entity (e.g., institution) to the archives owner and how authenticity components are addressed within the archives system ingest process.

3.4.1 Reliability of Records

A reliable record stands for the facts it contains—that is, the record's content can be trusted. The reliability of a record generally depends upon the completeness of the record's form and the control exercised over the process of creation. A reliable record has authority and it can be determined who created it, when it was created, how it was created, and the purpose for which it was created. The originators of records (e.g., in this case, the transferring entity) may be responsible for creating and maintaining reliable records, digital or otherwise. One purpose of an archives is to preserve reliability over time, which archivists generally refer to as "maintaining authentic records."

When judging the reliability of records, trustworthiness is synonymous with reliability. In the archival literature, trustworthiness is often defined in terms of reliability and authenticity. In the context of electronic records, trustworthiness often implies that the system is dependable and produces consistent results based on well-established procedures.

The archives system may address reliability because it will be of long-term interest to users of the records. Furthermore, in the case of the ERA example, reliability spans multiple stakeholders that include the different initiating government agencies that transfer their records to NARA for preservation.

Archives system services may be developed to be flexible to handle differing reliability criteria for digital records. For example, digital records may be accepted from the transferring entities "as-is" and maintain reliability as a factor as records are accepted for ingest.

3.4.2 Transfer Process

The archives transfer process may include electronic transmission or physical media shipping of electronic records from transferring entities. The electronic transmission of a transfer package may include, for example, 2-Factor or Strong Authentication between the transferring entity and archives for the connection and transmission. The transfer protocol may confirm successful transmission of all bits of data. In the event of a failure to successfully transmit the transfer package, the transfer protocol may retry the transmission.

In certain example embodiments, data files both in and not within a defined transfer package may be accepted. For those data files that are contained within a defined transfer package, a digital hash may be generated during the creation of the package. This will provide reliability of the records when the package is opened inside the archives system during ingest processing. Non-packaged data may have integrity asserted at the time of ingest processing. Physical media shipped to the archives system may not have any additional authenticity and/or reliability during the transfer process. Optionally, an Interface Control Document (ICD) that engages the external transferring entities to instill an orderly transfer process may be provided.

In one example embodiment, according to SF 258, "Agreement to Transfer Records to NARA," the transfer of records is in accordance with U.S Code that states that custody of the records becomes the responsibility of the Archivist of the United States at the time of transfer of the records. The Archivist may destroy, donate, or otherwise dispose of any containers, duplicate copies, unused forms and non-archival printed material. The Archivist will use the General Records Schedule and any applicable records disposition schedule of the transferring agency to dispose of non-archival material.

3.4.3 Ingest Processing

Figure 7:
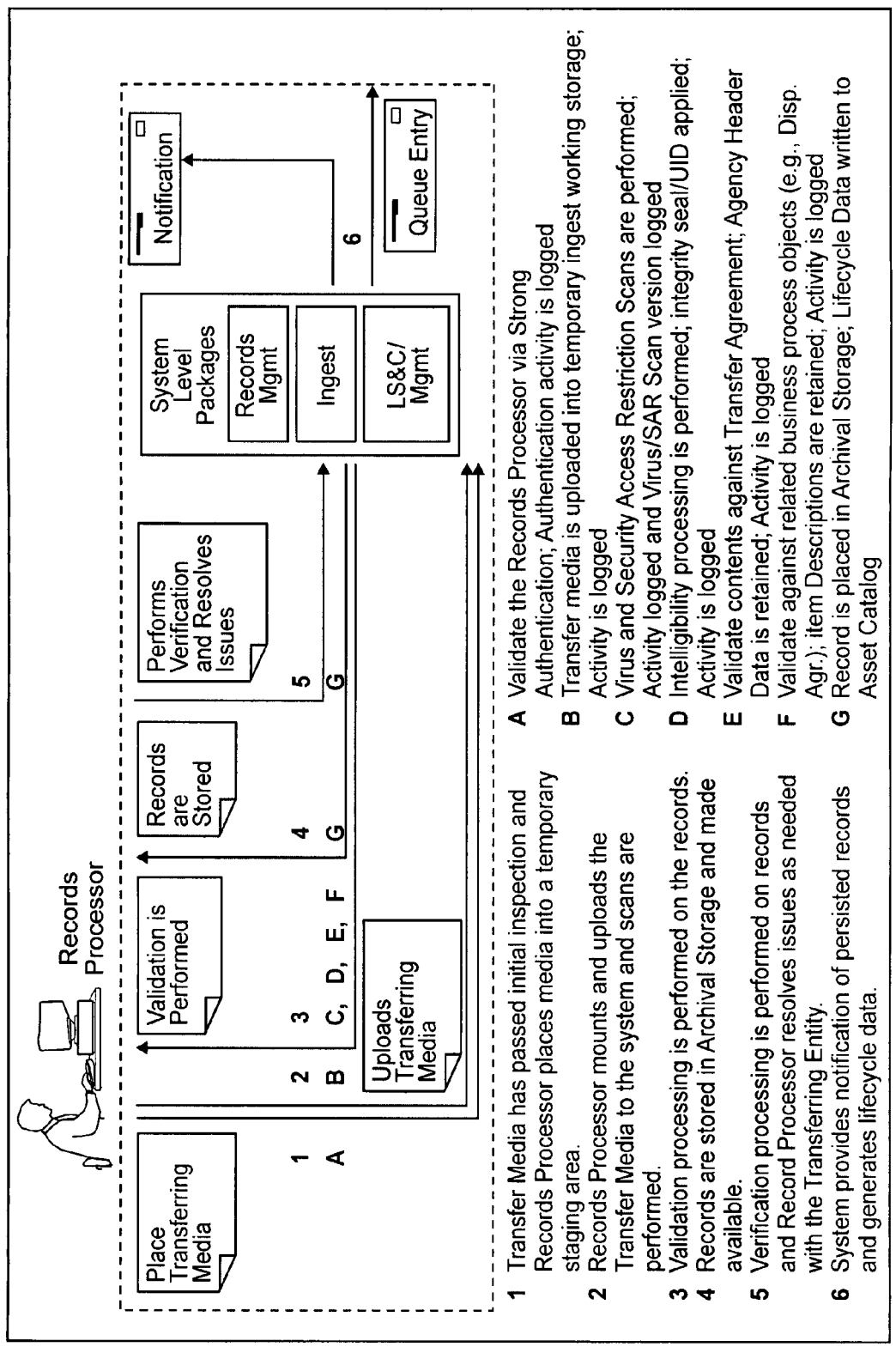
FIG. 7 shows illustrative business workflow processes and steps to implement authenticity during ingest processing of transfers in accordance with an example embodiment.

The ingest process may combine the human interaction that is necessary for records processing along with the high-speed ingest process to transmit large volumes of records. FIG. 7 shows illustrative business workflow processes and steps to implement authenticity during ingest processing of transfers in accordance with an example embodiment. The business processes that the archives system conducts may include, for example, the following:

1. The initial step on the archives system side is to ensure that the transfer media that contain the records have passed initial visual inspection and the system records processor places the media into a temporary staging area.
2. The system records processor then ensures that the media are mounted for upload into the system. The system then performs scans that include security and integrity checks as automated processes.
3. The system then conducts validation checks to ensure that the electronic bit-stream that relates to records is intact.
4. The files for the records are stored within managed storage, and the files/records are made available for searching based on the use of an electronic asset catalog.
5. The system ensures that verification processing is conducted manually on the files/records and the records processor resolves issues with the external transferring entity.
6. The system then provides its users with notification of the records that are stored for preservation and persists the necessary metadata for the records lifecycle.

Of course, it will be appreciated that some or all of these steps may be performed in different orders and that some or all of these steps may be combined into fewer steps in certain example embodiments.

Now that the system ingest processes are described, the authenticity components can now be cross-referenced to ensure that authenticity of records is supported. FIG. 7 also provides a set of steps in alphabetics, that correlate with ingest processing tasks.

- A. When the transfer media are placed into the temporary staging area, the archives system validates the Records Processor via a 2-Factor Authentication. This identification and authentication activity is logged.
- B. When the system uploads the electronic media into temporary working storage, this system activity is audited and logged.
- C. During the scanning and validation process, the system conducts virus and security restriction scans. To preserve integrity, the system activity is logged and the Virus/SAR scan version is logged.
- D. Intelligibility processing is conducted within the validation process that includes ensuring that digital files that contain the records can be opened and used. An integrity seal (e.g., hash algorithm) is applied to the file. This system activity is audited and logged.
- E. During the validation process, the system validates the contents of the file against the transfer documentation from the external agency. The agency header information that identifies the context for the record is retained and the system activity is logged.
- F. The validation process includes fixity checks. This includes record validation against the disposition agreement and other related business objects. The system retains item characteristics and the system activity is logged.
- G. The record is placed in managed storage that includes persisted information. The system generates lifecycle metadata that supports the searchability of the record and this information is kept within the electronic asset catalog.

Again, it will be appreciated that some or all of these steps may be performed in different orders and that some or all of these steps may be combined into fewer steps in certain example embodiments.

3.5 Example Implementation for Standard Process for Electronic Archives 3.5.1 Implementation of Standard Business Practices Archives systems according to certain example embodiments may be designed based on, for example, the foundation of standard NARA business policies and processes. NARA has been a recognized leader in the development of policies and processes in archives and records management. The archives system may be flexible enough to implement both current policies and new ones that are developed as the archives system matures.

In terms of admissibility of records into evidence, courts tend to admit records that are created in the "normal course of business" by dependable human and machine processes. This standard also may be applied if and when an archives system is tested in the courts.

In another example, NARA has formed a Business Practices Integrated Product Team (BP IPT) that is defining NARA's business policies and processes that would then be codified into the ERA system. This concrete expression of policies and procedures may help to defend records in ERA. This BP IPT is putting together a baseline to define the system process in the current and future environments.

Subsequent section(s) provide details on illustrative archives system test processes that include rigorous test procedures to demonstrate that policies and processes are expressed in dependable system actions.

3.5.2 Lifecycle View of Authenticity

The archives system may draw upon the archival concept put forth by the Open Archival Information System (OAIS) reference model. The archives system may extend the OAIS reference model and map the model's archival functions to system-level service packages, and/or tangible components of the archives system. A lifecycle view can now be defined that allows authenticity of records to be attested based on the overall records lifecycle.

Figure 8:
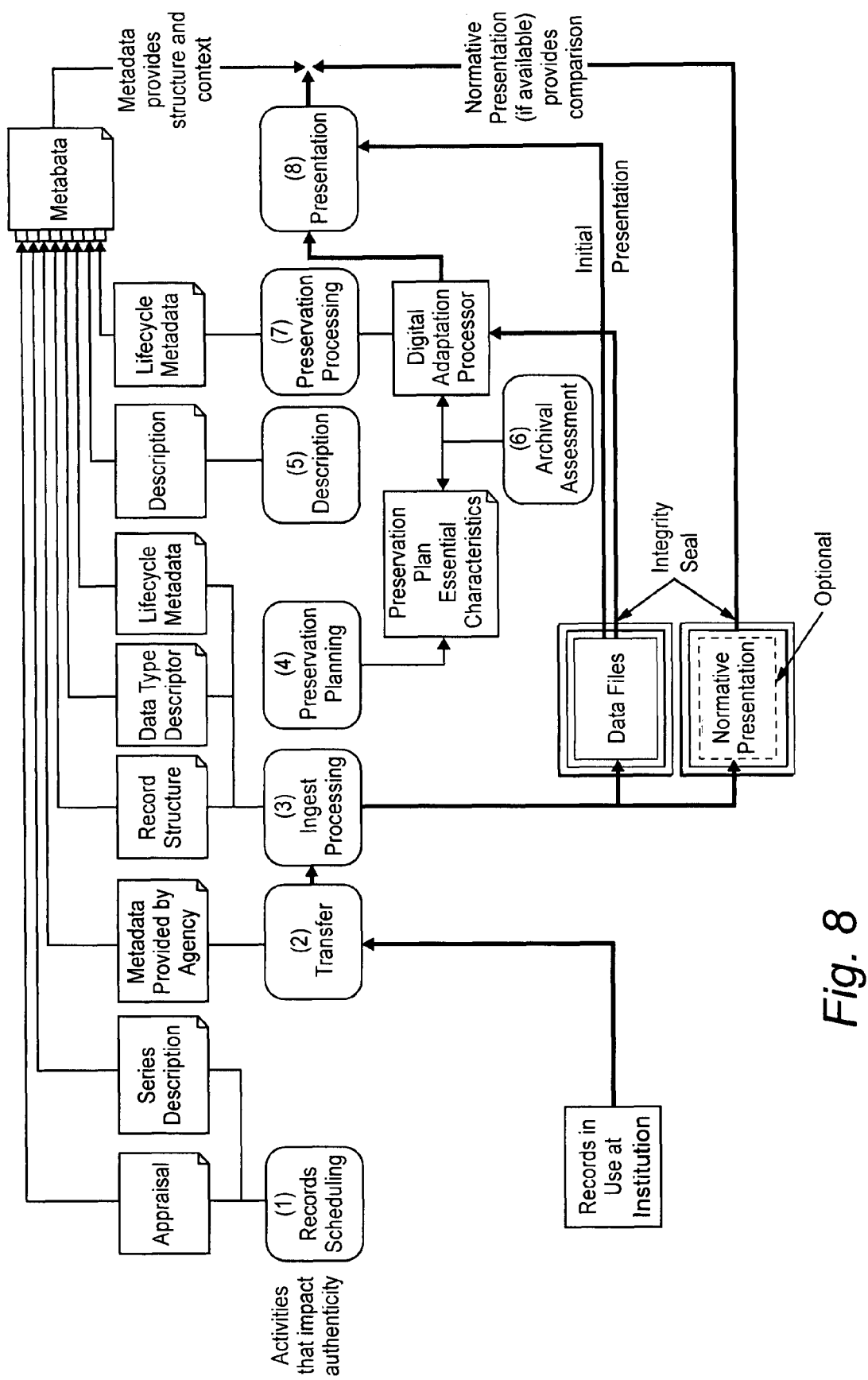
FIG. 8 steps through an illustrative lifecycle view by identifying each activity that impacts authenticity.

FIG. 8 steps through an illustrative lifecycle view by identifying each activity that impacts authenticity. The lifecycle begins as records go through the process of appraisal all the way to being archived within the archives system. The activities are numbered based on the flow of the archives system. The archives system design approach is entwined within this lifecycle view, and the textual context is provided for each activity below.

1. Records Scheduling
   a. Establishes that records are permanent and will be transferred to an archives. This includes descriptions of context and purpose in appraisal reports and series descriptions in schedule items.
2. Transfer
   a. The secure transmission of the electronic records to the archives system.
   b. Comprises metadata from transferring entity that includes the record structure.
   c. Establishes proof of integrity of the data files from transferring entity to archives.
3. Ingest Processing
   a. Unpackaging and initial processing of transferred files.
   b. Integrity seal applied to data files.
   c. Captures metadata, including record structure, from transferring entity.
   d. Captures lifecycle data in respect to any processing on the data files.
   e. Extracts additional metadata, and associates to templates—notably data type descriptor.
4. Preservation Planning (which may occur prior to or after transfer to archives)
   a. The archival determination and recording of essential characteristics that must be preserved.
5. Description
   a. Creation of description and additional metadata to provide context for records.
6. Assessment (e.g., of digital adaptation processing and presentation)
   a. Archival assessment of the capability of adaptation processing to preserve essential characteristics.
   b. Archival assessment of the capability of presentation functionality to express the essential characteristics that have been preserved.
7. Preservation Processing
   a. Selection of digital adaptation processing that best preserves essential characteristics.
8. Presentation functionality
   a. Ability of presentation functionality to express essential characteristics.

3.5.3 Archives System Design Considerations

Several design considerations may be taken into account when providing for authenticity of records within the broader archives system design. Design consideration may include one or more of the following exemplary considerations:

- Ability to receive reliable digital records from institutions or donors;
- As part of the templates for records, development of default authenticity requirements for different types of records;
- Use of archival judgment to assess the capability of processes that create new digital versions of record material, and presentation technologies that are used to create renditions of the records;
- Use of National Institute of Standards and Technology (NIST) approved mathematical algorithms to establish the bit-level integrity of content of digital files and provide the capability to assess the bit-level integrity of data files into the future;
- Throughout the rest of the records' lifecycle after ingest, ability to produce copies of the digital record (and associated metadata) that can be used to judge the continuing authenticity of the records; and/or
- Functionality to attest to the authenticity of records being based on incremental development.

Of course, it will be appreciated that the same are provided by way of example and without limitation.

3.5.3.1 Archival vs. System Assessment

Both archival judgment and system processes embedded into the archives system may play a role in determining authenticity. The large volume of records may require computer-implemented methods to evaluate the conditions for authenticity of records. Human assessment may be applied to archives system processes that impact authenticity using sampled records as part of a user acceptance testing process that can serve as quality control. Computer-implemented processes may be incorporated within the archives system based on its increment-based release of functionality. These processes may codify business processes into system orchestrations and controls that are built into the system.

3.5.3.2 Use of Templates

Templates that define the essential characteristics of record types may be developed. For example, according to NARA, a template is a set of specifications about a type of electronic document, record, donated material, or an aggregate of such electronic documentary materials. Such templates may provide flexibility and extensibility to the architecture and may also provide a mechanism for the system to evolve and adapt to changing organizational needs.

Within the lifecycle view, part of the appraisal process of electronic records may include confirming the template that should be applied to a body of material destined for the archives. The template may be updated as appropriate for the material covered by a specific schedule item. Templates also may be applicable throughout the archives system records lifecycle.

3.5.3.3 Metadata Management

Metadata may be captured and/or generated within each activity that impacts authenticity within the records lifecycle. The archives system may have an extensible concept of metadata, which includes lifecycle data, description, and templates, that will bind templates, and contextual, descriptive, and provenance information to physical objects (e.g., data files) and conceptual objects. This metadata may be available for presentation along with records to assist in establishing their authenticity.

The archives system may incorporate the design for an Asset Catalog, which may hold an entry for every physical object (e.g., data file) and for all conceptual objects (e.g., record series, collection, etc.). The design of the asset catalog entries may save the structure of conceptual arrangements and their associated physical objects such that the structure of records is persisted. The asset catalog may provide the binding between the metadata of the record and the data files that contain records stored within the archives.

Figure 9:
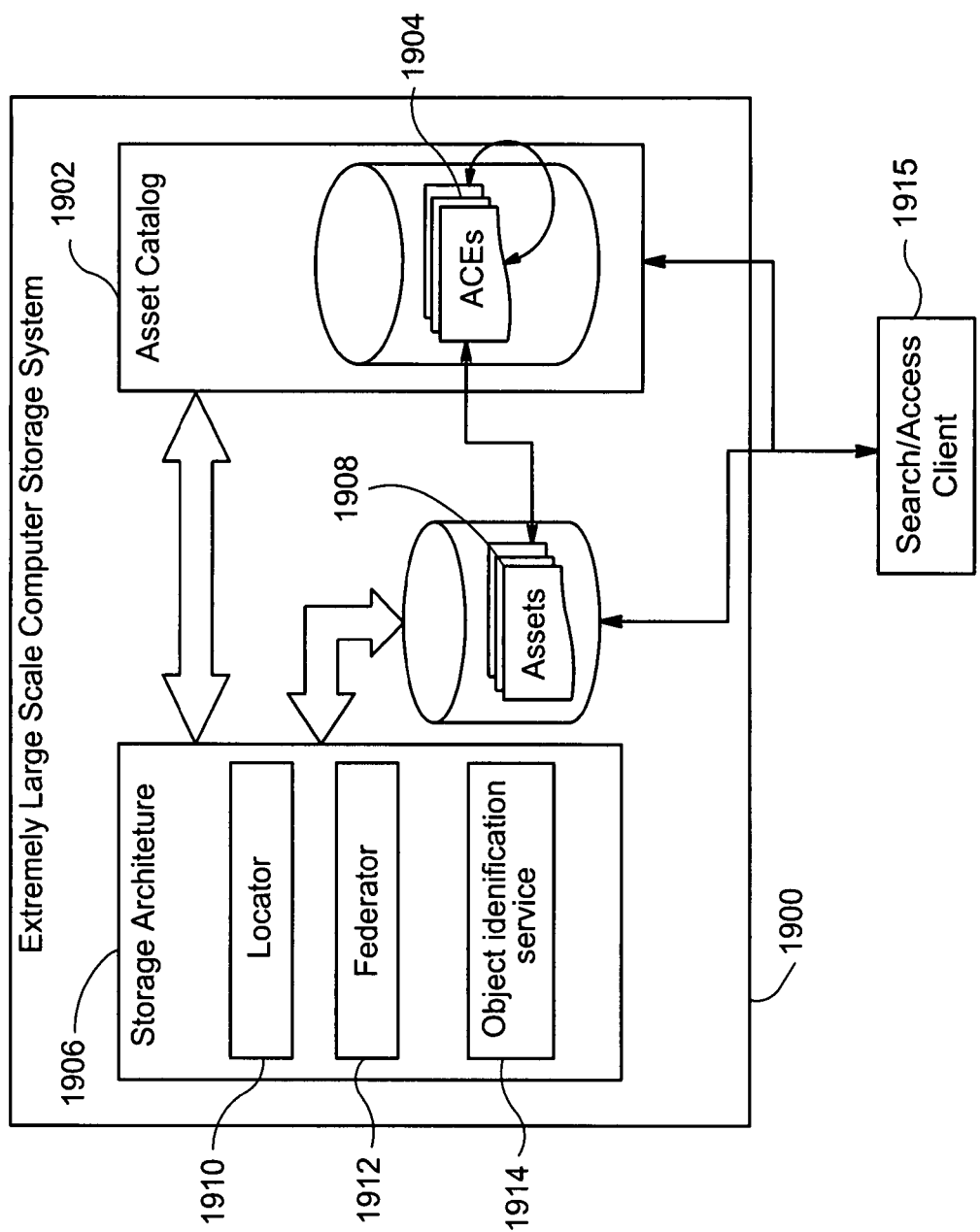
FIG. 9 is an exemplary extremely large scale computer storage system.

FIG. 9, for example, is a high-level overview of an illustrative system. More particularly, FIG. 9 is an extremely large scale computer storage system 1900 in accordance with an example embodiment. An asset catalog 1902 may comprise a plurality of asset catalog entries 1904 stored according to at least one schema and corresponding to a plurality of assets 1908. A storage architecture 1906 may be capable of storing the plurality of assets 1908, with the storage architecture 1906 comprising a storage locator 1910 and a federator 1912 (and, optionally, an object identification service 1914). An item identification scheme may be capable of providing identifiers to reference, locate, and/or access said assets 1908 and/or said asset catalog entries 1904 stored in the asset catalog 1902 in the storage architecture 1906. The computer storage system 1900 may be scalable essentially without limitation while maintaining asset storage and retrieval flexibility and substantially obsolescence-proof survivability of assets. Optionally, a search/access client 1915 also may be provided. Of course, it will be appreciated that the example embodiments shown and described in connection with FIG. 9 are provided by way of example and without limitation.

3.5.3.4 Testing for Essential Characteristics

Detailed information regarding the essential characteristics for records per record type and the criteria or process being used when employing archival judgment to determine the authenticity of records may be used to develop test criteria associated with archival judgment and the evaluation of essential characteristics of records.

3.5.4 System Processes for Implementation

This section provides illustrative archives system processes that step through the lifecycle view of authenticity and capture how authenticity components are fulfilled.

3.5.4.1 Records Scheduling

Certain activities for the record scheduling step may include, for example, capturing details of context and purpose in series descriptions (Transferring Entity); capturing details of context and purpose in appraisal reports; and, defining essential characteristics of the records. The archives system level packages attributed to this function may include Records Management and Preservation. The components to verify authenticity of records may include, for example:

- Content—summary of content at record series level;
- Context—provides basis for understanding use of records in original context;
- Essential Characteristics—records are associated to a record type template that includes the definition of the essential characteristics of these records; and,
- Provenance—establishes origin of records by agency and unit, may define custodial plan for records prior to transfer.

3.5.4.2 Transfer to Archives

The primary activities for the transfer to archives step may include, for example, records transferred to physical custody; ensure and verify use of legal transfer instrument; capture metadata (on the part of the Transferring Entity and/or archives system); capture arrangement and original order (from the Transferring Entity); and establish bit-level integrity (by the archives system).

The archives system package attributed to this function may include Transfer/Ingest. The components to verify authenticity of records may include, for example:

Content—captures metadata from agency which may include content information;

Structure—captures arrangement of data files and purported original order of records;

Context—captures metadata from agency which may include context information;

Provenance—record of transfer occurrence establishes proof of provenance from agency, and establishes physical control of records, baselining, for example, custody of records; and Integrity—establish baseline for bit-level integrity of the data files.

3.5.4.3 Ingest Processing

The primary activities for the ingest processing step may be to ensure, for example, that data files are verified, record type is verified, and/or that records are written to archives. The ERA system package attributed to this function is Transfer/Ingest. The components to verify authenticity of records may include, for example:

Structure—structure for records and data files is persisted in asset catalog entries. May extract additional metadata from data file headers that assist in understanding data file structure(s).

Essential Characteristics—determines the data type of the data files, which provides a relationship to a data type descriptor that will be used in preservation processing and which defines any initial processing that must occur prior to writing data files to the archives (such as extracting files from a composite file).

Provenance—adds a series of lifecycle events that represent verifications performed on data files (virus scan, access restricted material scan).

Integrity—validates the bit-level integrity seal applied prior to transfer on data files, and validates all files are received.

3.5.4.4 Preservation Planning

The activities' associated with the preservation planning step may help to ensure archival determination of essential characteristics that must be preserved. This may occur prior to or after transfer. The system package attributed to this function is Preservation. The components to verify authenticity of records may include, for example:

Content—ensures information and meaning will be preserved through the definition of essential characteristics;

Structure—may include aspects of structure; and,

Essential Characteristics—defines the essential characteristics to be preserved.

3.5.4.5 Archival Description

One activity for the archival description step is to ensure creation of description and additional metadata to provide context for records. The system package attributed to this function is Records Management. The components to verify authenticity of records may include, for example:

Content—provides informational aids (various notes) to assist in understanding the information and meaning in the records;

Structure—provides additional metadata that aids in establishing structure of the records;

Context—provides additional metadata that aids in establishing context of the records; and, Provenance—may add additional information in respect to the origin and/or chain of custody of the records.

3.5.4.6 Assessment of Digital Adaptation Processors and Presentation

The following items may be addressed by an archivist: archival assessment of the capability of adaptation processing to preserve essential characteristics, and archival assessment of the capability of presentation functionality to express the essential characteristics that have been preserved. The activities associated with this assessment step may help to develop digital processing functionality to create more persistent formats for data files; create and/or identify technologies to present the persistent data files; and/or assess the degree to which the digital processors and presentation technologies preserve defined essential characteristics. The system package attributed to this function is Preservation/Dissemination. The components to verify authenticity of records may include, for example:

Content—determines the manner in which content will be presented to users in future;

Structure—reflects the structure of the records in presentation to a consumer of the records; and, Essential Characteristics—expresses the essential characteristics that have been defined, to some degree, and determines the degree of fidelity of that expression.

3.5.4.7 Preservation Processing

One activity for preservation processing step may help to ensure selection of digital adaptation processing that best preserves essential characteristics. The system package attributed to this function is Preservation. The components to verify authenticity of records may include, for example:

Content—determines which digital adaptation processors will best preserve the information and meaning of the records by ranking each in terms of how well it preserves the essential characteristics specific to the records being processed;

Structure—determines which digital adaptation processors will best preserve the structure of records;

Essential Characteristics—as discussed above, this preservation processing step is to address essential characteristics; and, Integrity—when using original data files, this validates the integrity seal on those data files.

3.5.4.8 Presentation Functionality

Activities associated with the presentation functionality step may help to ensure that records are presented to users (the step may involve presenting more persistent formats), and may help to associate data types to presentation technologies, providing information on how particular presentation methods support authenticity. The ERA system package attributed to this function is Dissemination. The components to verify authenticity of records may include, for example:

Content—determines how the consumer of a record will experience that record;

Structure—determines how the consumer of a record will experience the structure of a record; and, Essential Characteristics—determines which essential characteristics will be expressed in the presentation of the record and the fidelity of that expression.

3.6 Example Implementation for Archives System Credibility

This section addresses the system credibility layer within the records archives support structure for authenticity that incorporates use of Information Assurance controls and adherence to standard processes. This credibility rests on implementing, for example, information assurance controls in accordance with industry standards and system certification and accreditation, standard business processes that include quality assurance and configuration management, integration and testing of the archives system that include component testing and end-to-end testing of system level functionality to ensure the system performs as expected, and/or operations and support processes. A description of each of these processes follows.

3.6.1 Information Assurance Considerations

One aspect in ensuring the authenticity of records is to adhere to Information Assurance (IA) controls that address the application of IA protections in support of the archives system. The archives system may be accredited to ensure that security requirements stated within policy documents are met. A security Risk Assessment may be performed to determine which security controls are needed to provide the requisite assurance that the system is adequately protected.

3.6.1.1 Policy Guidelines

Information assurance is the application of policies, processes, and procedures in a defense-in-depth posture to support confidentiality, integrity, and availability of information systems. NIST has established a series of guidelines to facilitate the implementation of IA protections for information systems. These protections are embodied as mandatory, minimum, security requirements in Federal Information Processing Standard (FIPS) 200, *Minimum Security Requirements for Federal Information and Information Systems*. These seventeen requirements are part of the ERA system accreditation and are categorized in Table 2, below.

TABLE 2

| Class | Family | Identifier |
|---|---|---|
| Management | Security Risk Assessment | RA |
| Management | Planning | PL |
| Management | System and Services Acquisition | SA |
| Management | Certification, Accreditation, and Security Assessments | CA |
| Operational | Personnel Security | PS |
| Operational | Physical and Environmental Protection | PE |
| Operational | Contingency Planning | CP |
| Operational | Configuration Management | CM |
| Operational | Maintenance | MA |
| Operational | System and Information Integrity | SI |
| Operational | Media Protection | MP |
| Operational | Incident Response | IR |
| Operational | Awareness and Training | AT |
| Technical | Identification and Authentication | IA |
| Technical | Access Control | AC |
| Technical | Audit and Accountability | AU |
| Technical | System and Communications Protection | SC |

3.6.1.2 Information Assurance Principles Relating to Authenticity

The five general IA principles may be applied to the specifics of the archives system to support the authenticity of records. The five core IA principles are:

Availability—the state where information is in the place needed by the user, at the time the user needs it, and in the form needed by the user.

Identification and Authentication—process to recognize an entity, coupled with a means of verifying an individual's authorization to receive specific categories of information.

Confidentiality—assurance that information is not disclosed to unauthorized persons, processes, or devices.

Integrity—quality of an IT system reflecting the logical correctness and reliability of the operating system; the logical completeness of the hardware and software implementing the protection mechanisms; and the consistency of the information structures and occurrence of the stored information.

Non-repudiation—the method by which the sender of information is provided with proof of delivery and the recipient is assured of the sender's identity so that neither can later deny having processed the information Table 3 relates the general IA principles to the authenticity of records in the archives system.

TABLE 3

| IA Principles | Implementation Relating To Authenticity |
|---|---|
| Availability | Not relevant to Authenticity |
| Identification and Authentication | This applies to archivists and records administrators and transferring systems that need to be authenticated within the archives system. The requirement helps ensure that Transferring Entities are who they claim to be. |
| Confidentiality | This principle ensures that: Only authorized users have access to archived assets; incorporates roles based access control Ensures that data transfers between sites are encrypted Data at rest is protected by restricting access to authorized users who may only perform authorized functions Ensures compartmentalized security classifications The system implements handling restrictions of records as determined by the transferring entity, donor or records manager |
| Integrity | Proof that the digital asset has remained unchanged: The archives system ensures that an integrity seal is applied upon ingest into the system via a content-based hash ID Implementation of roles-based access control ensures that only those users who are authorized to alter/update/view/modify a record within the archives system may do so. |
| Non-repudiation | Ensure that the originator cannot deny that the assets are theirs Audit trail that captures who did what to the record, and record change history Identification of a record's originator (e.g. human user, transferring entity, or system user). |

Based on the five IA principles, the archives system may abide by NIST FIPS 200 security policy guidelines to ensure that security controls are in place. This may apply to all of the security controls within the Identification & Authentication family and the Access Control family, along with Integrity and Non-repudiation controls.

3.6.2 Standard Business Processes

This section provides a brief description of the adherence to standard business processes, such as, for example, quality management and configuration management in the development of the archives system.

3.6.2.1 Quality Management Considerations

Standards-settings organizations may approve quality management standards that may, in turn, be used in connection with archives systems. For example, Lockheed Martin Transportation and Security Solutions (TSS) has a full set of business processes that are contained within its Business Process System Library (BPSL) that have been determined to be compliant with ISO 9001:2000 and CMMI Level 5. These LM BPSL processes may be used with and/or tailored for use with the records archives. For example, the CMMI Level 5 rating certifies that the processes and procedures in use are standardized, repeatable and predictable.

Within the BPSL, there are standard process categories for: Company Level Management Processes, Program Management Processes, New Business Processes, Engineering, Technology, & Operations Processes, and Business Operations Processes. The following nine TSS processes have then been tailored for the ERA Program for use with NARA: ERA Schedule Management Process (ERA-D20); ERA Configuration and Change Control (ERA-F10-S004); ERA Engineering Process Compliance Matrix (ERA-E05-Compliance); ERA Integrated Engineering process (ERA-E05-01); ERA System Design Process (ERA-E30); ERA Software Requirements Development (ERA-E35-S00-01); ERA Product Software Architecture (ERA-E35-S002); ERA Adaptation Value Determination (ERA-E35-S004); and ERA Software Development and Test (ERA-E40-S001-01). Experts in Quality Assurance may monitor compliance with the above and/or other processes. They may represent an independent voice reporting directly to a Program Manager.

3.6.2.2 Configuration Management Considerations

Configuration Management (CM) may cover a broad spectrum of responsibilities. The tasks listed below identify CM responsibilities based on standard CM processes, and can relate to upholding record authenticity.

- Coordinate CM functions to assure an integrated CM effort within the archives system;
- Establish Data Management process to establish and apply Data Management (DM) standards to both deliverable and non-deliverable data;
- Develop and document ERA CM processes and standards;
- Implement and administer Change Management processes throughout the program's lifecycle;
- Implement formal control of the requirements specifications that define the formal baselines through the Specification Management function of CM;
- Control the design and deployment of the equipment for the archives system through the Hardware CM function;
- Control the formal builds and packaging of all developed software through the CM Software Builds and Controls (B&C) function;
- Maintain and manage the configuration of COTS software through the Commercial-Off-the-Shelf Software Builds and Controls (COTS SW B&C) function;
- Provide Product Control for program software products, including software license management;
- Control the formal test environment through the Test Configuration Management (TCM) function;
- Provide information about the current status of the archives system through Configuration Status Accounting;
- Conduct CM Configuration Audits during various steps through the program's lifecycle, e.g., a Functional Configuration Audit (FCA) and a Physical Configuration Audit (PCA);
- Track request for deviations and waivers for system requirements to completion; and
- Coordinate and oversee the Program Trouble Reporting process through the Problem Management function of CM.

Configuration management helps to establish baselines and controls to baselines in several key areas. This may help to defend the integrity of the archives system if challenged (e.g., in a legal dispute).

3.6.3 Testing Considerations

The testing program helps prove that the records archives system is reliable. The testing program may help to "close the loop" on standard business policies and procedures by proving that the system actually did was it was designed to do.

3.6.3.1 Integration and Test

The Integration and Test (I&T) process may comprise the tasks and activities needed to build and test the archives system incrementally through different phases. The test approach may follow the same mature proven ISO 9001:2000 and Capability Maturity Model Integration (CMMI) Level 5 process. This approach may be tailored to address the unique characteristics of the archives system, including the Service Oriented Architecture (SOA), distributed deployment, external interface requirements, security requirements, human factors specifications, and/or the use of COTS products. Adherence to the processes leads to a carefully planned, disciplined, rigorous, controlled, and structured integration and test program to ensure a high quality, stable, usable system, satisfying high-level system requirements in conjunction with demanding acceptance criteria.

Figure 10:
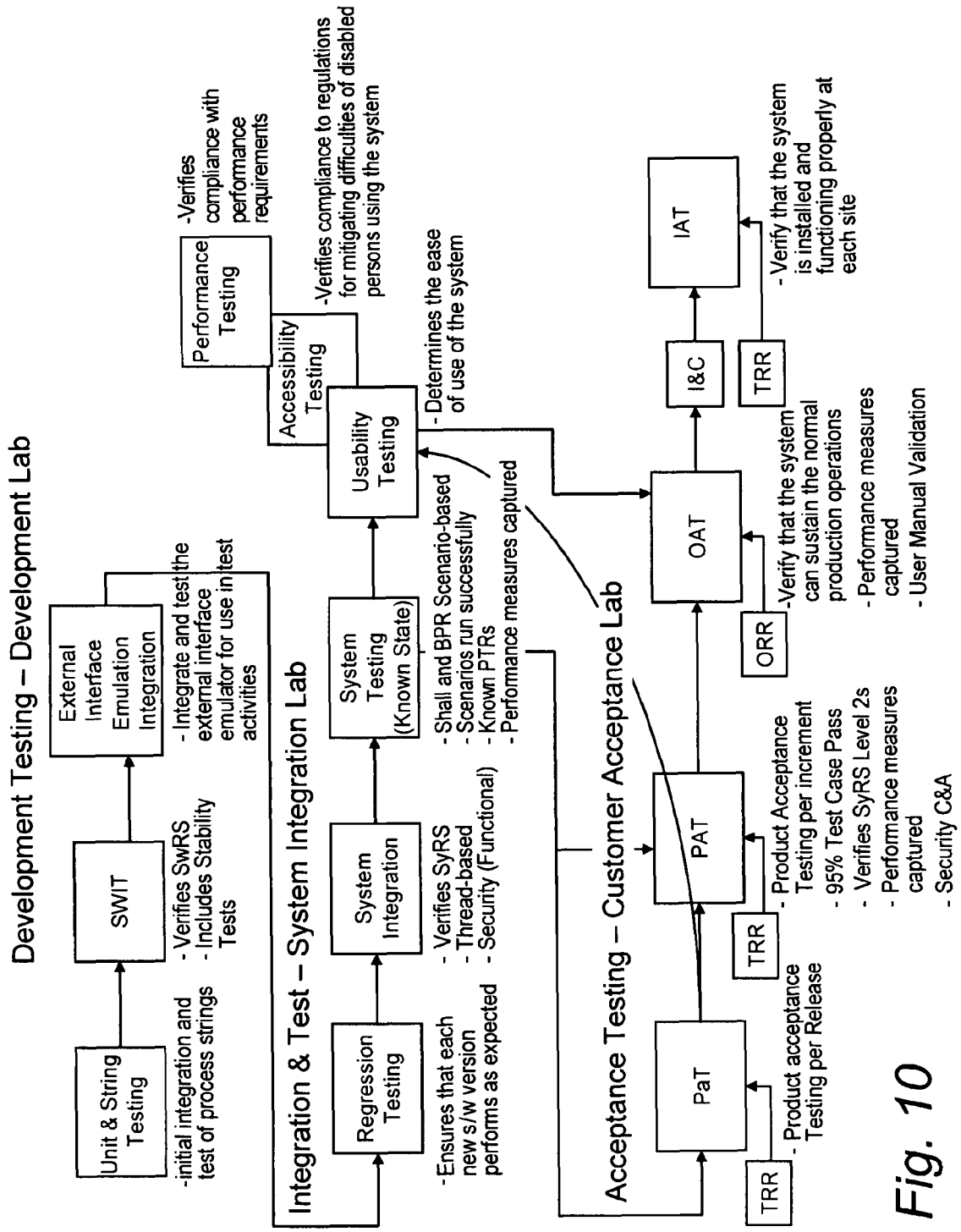
FIG. 10 helps illustrate an exemplary integration and test lifecycle.

I&T activities may starts with development testing at the archives system development lab that includes: unit and string testing, software integration testing, and external interface emulation and integration. The next step is system integration testing that is conducted at a facility that mirrors the archives system in production. This includes regression testing, system integration, system testing, usability testing, accessibility testing, and performance testing. The final set of testing is known as acceptance testing and this is done within a customer acceptance test lab that includes product acceptance testing on a release and increment basis, operational acceptance testing and installation acceptance testing. FIG. 10 depicts this illustrative Integration & Test Lifecycle.

3.6.3.2 Verification and Validation

One purpose of the I&T Lifecycle is to verify and validate the archives system. Within this context, verification refers to the activities performed to ensure that the system that was built accurately reflects the intent of the system requirements, e.g., it provides confirmation that the correct system was built. Validation activities confirm that the system that was built functions as intended, e.g., the system performs activities correctly and returns the expected results. These activities are performed on many levels (unit, software, system) and from different perspectives (human factors, security, and performance).

Execution of the I&T Lifecycle may help to ensure authenticity by verifying that the pillars of the archives system support structure for authenticity mentioned above have been incorporated the software and system requirements that codify this functionality. Test procedures and test cases incorporate elements to demonstrate that the specified functionality has been built, is available to authorized users, and functions as intended. Although the archives system credibility and the necessary conditions for authenticity can be verified and validated, the determination of the authenticity of a record still requires the application of archival judgment via one or more predetermined standards. Implementation of these standards will establish the archives system's ability to preserve authentic records.

3.6.3.3 End-to-End Testing

Standard business processes, which utilize the preservation of authentic records as its fundamental precept, may serve as the foundation to establishing the authenticity of the records within the archives system. Therefore, end-to-end testing may be performed to establish the archives system's ability to support standard business processes. End-to-End testing may be conducted at the end of each increment. It may be comprised of a series of regression tests and system level scenarios developed in conjunction with subject matter experts (SME) and based on the output of the Business Process IPT. Each scenario may contain a mapping of the steps to the conditions necessary for authenticity and therefore prove that authenticity has been built into the system and that the system can produce authentic records.

3.6.4 Archives System Operations and Support Processes

Operations and support processes may be thought of as a set of formally documented and repeatable actions or events required for achieving specific goals. It is the means by which an operations team may provide consistent and reliable support to the archives system, satisfy the requirements of the archiving entity, and pursue continuous improvement and growth for the archive system. The following illustrative operational processes may be required to provide consistent and reliable support for the archives system:

System Monitoring—the system monitoring process may provide continuous monitoring and analysis of the archives system infrastructure. During system operation, periodic checks can be conducted to ensure system and data integrity during processes such as backup and restore.

Backup and Restore—there are two methods for the backup and restoration of the archives system that provide a safeguard against the loss of system data including archival assets. A first method may be implemented in an automated manner by the archives system that uses COTS backup and restore products. As a supplement to these services, a manual backup and restore process provides an additional capability that will be manually executed by SOC team members on an as-needed basis.

System Problem Diagnosis and Repair—the system problem diagnosis and repair process may provide for the management and tracking of all archives system infrastructure issues and problems impacting the archives system.

System Maintenance—the system maintenance process may outline how routine, periodic, and preventative maintenance will occur for the archives system.

Inventory Control—the Inventory Control Process may provide for the tracking of all shipments of archives system materials, hardware, software, and supplies.

Help Desk—the Help Desk Process may help manage and track all reported problems.

Government Media Inventory Control—the Government Media Inventory Control process may manage government media received at the ERA facility in a consistent, predictable manner.

Request for Deletion of a Record—the Request for Deletion of Record Process may provides the archiving entity the capability to designate, approve, and delete records in the archives system in a consistent and predictable manner.

4. Risk Mitigation and Incremental Authenticity Deployment 4.1 Program Risk Mitigation It will be appreciated that the embodiments disclosed herein may help to provide program risk mitigation to the overall problem associated with the authenticity of records. To address the overall question, a support structure for the archives system that helps to establish authenticity that includes a combination of system credibility measures and necessary authenticity components may be provided. Authenticity may be provided in connection with electronic records. Custom and/or standard processes may be used to address system accreditation and overall system credibility.

Three components help assess authenticity of electronic records:

1. Provenance: ensuring that records captured within the archives system can be traced back to their origination.
2. Integrity: protecting the data within the system with information assurance controls upholding the five principles that include: integrity, availability, confidentiality, non-repudiation, and authentication and identification.
3. Essential Characteristics: making certain that the records continue to embody their fundamental nature as determined by the archivists.

Achieving this requires a design that identifies the necessary components for establishing authenticity, designing to ensure these conditions are met, and ensuring that the system itself is reliable and credible.

4.2 Functionality Allocation to Archives System Increments

Functionality may be provided in distinct groupings over time. This development strategy may contribute to overall system reliability because, for example, each successive increment may be analyzed and/or certified as being reliable and contributing to system reliability in the interim. For example, an initial increment may provide:

Records Scheduling—create records schedule.

Preservation Plans (limited)—record suggestions for essential characteristics; the identification of essential characteristics is currently a work in progress and so the functionality provided within the initial increment is limited.

Transfer to Archives—capture available metadata from transferring entities, capture available original order information, apply integrity seal.

Ingest Processing—take physical control of records, establish lifecycle data baseline, and validate integrity seal.

Lifecycle and Audit Data—address deployed system processes to maintain provenance.

One or more further increments may provide:

Digital Adaptation—creation of more persistent electronic formats for records.

Archival Descriptions—providing additional lifecycle data that supports authenticity.

Preservation Plans (enhanced)—support archival determination of essential characteristics that must be preserved for permanent records.

Preservation Processing—selection of digital adaptation processing that best preserves essential characteristics.

Presentation Functionality—present records to users in more persistent formats, provide different data types that associate with presentation formats.

Lifecycle and Audit Data—expanded support for added processing.

5. Exemplary Overview of Authenticity in an Electronic Records Archives System

5.1 Exemplary Definitions and Illustrative Aspects

As used herein, the term "asset" may include any electronic (e.g., digital) information archived in an archives system, and the term "electronic record" may include a single conceptual object, which may be comprised of multiple files, that is made or received by an organization or institution. An electronic record is a type of electronic asset. A non-record asset may be information about or derived from records. Authenticity applies to records, though elements of authenticity, such as integrity, apply to all assets.

Certain example embodiments establish and/or maintain the authenticity of records stored in an electronic archives system. The example systems and methods generally may provide a comprehensive set of processes that achieve new, higher levels of authenticity standards. One aspect of authenticity relates to provenance, as described above, refers to the origin or source from which something comes along with the history of subsequent owners (e.g., the chain of custody). Provenance is a fundamental principle of archives in general, referring to the individual, group, or organization that created or received the items, e.g., in a collection. Another aspect of authenticity involves the Essential Characteristics of an electronic record and, as described above, Essential Characteristics include those properties and/or characteristics of electronic records that must remain unchanged through transfer, ingest, storage and presentation or output of records (including preservation processing). A record's essential characteristics should remain unchanged so that there is no loss of the information content of the asset providing archival value, which may be needed for authenticity judgment.

Essential characteristic parameters may be defined by record type. It will be appreciated that essential characteristics of assets may change over time for a given record type if it becomes apparent in the future that some characteristic should have been captured or captured at a different standard, for example. To deal with this problem, either the original formats have to be interpretable forever, which means having to maintain an ever expanding capability (e.g., number of software applications) ready to interpret every format ever archived, or else original formats have to be adapted to modern, supported formats from time to time, which risks losing unforeseen essential characteristics if these adaptations cannot be lossless and inadvertently lose information needed for a characteristic subsequently determined to be essential. Certain example embodiments support both approaches and allow for a trade-off between these two approaches.

5.2 Exemplary Techniques for Establishing and Maintaining Authenticity

In certain example embodiments, a flexible set of processes and interfaces, enforced through workflow and computer-implemented sub-processes, may be combined to create a mechanism that meets a higher standard of electronic records authenticity and which can be used to archive other institutions' electronic records as well as an institution's own. For example, the processes may be flexible in that they accommodate various situations that may arise, e.g., if the originator of the materials to archive no longer exists (e.g., a defunct business) then not all information about the records may be available.

Some or all of these sub-processes may combine to provide new levels of authenticity in an archives system by providing the elements an archivist needs to make a judgment of authenticity over the life of the record, including, for example, ensuring asset integrity, establishing assets' essential characteristics, and providing provenance.

5.2.1 Example General Workflow

These elements are provided by the following exemplary general workflow. First, records and other associated electronic assets may be safeguarded through their lifecycles. This may include providing mechanisms to manage aspects of intended asset changes (e.g., record adaptations) and status, and also detecting unintended changes to assets (e.g., through file integrity seal checks). Second, associated context and structure may be extracted and preserved so that the meaning of the records is known and their essential characteristics are defined and recorded, including, for example, organizing records so that those created or received by one records keeping unit are not intermixed with those of any other, as may be necessary. Third, uninterrupted proof of custody may be maintained beginning as soon as possible (e.g., establishing and preserving proof of the records' source) and for the life of the record. Fourth, mechanisms may be established for defining and capturing the essential characteristics of archived records, and for preserving these characteristics in records as they may be adapted over the years from obsolete formats to new formats.

5.2.2 Example Sub-Process for Use with a General Workflow

The example workflow process described above may be used in connection with one or more of the following example sub-processes. In general, the sub-processes (or subroutines) correspond to acquiring records processes, ongoing processes, and horizontal functions. It will be appreciated that the following sub-processes may be made available via any suitable form of programmed logic circuitry.

5.2.2.1 Acquiring Records Processes

Records scheduling programmed logic circuitry generally establishes the records to archive and collects information about the records. Such records scheduling programmed logic circuitry may help to identify which records are permanent and will be transferred to an archives. It also may collect available initial information about the electronic records to be archived to plan their preservation and begin to establish their authenticity (e.g., the early collection of contextual information to establish chain of custody as early as possible thereby increasing authenticity). Information collected may include disposition (e.g., retention time), purpose, and context (e.g., structure, any existing appraisals, administrative and custodial history), such as may exist. Early collection of contextual information is part of bringing forward in the record lifecycle certain elements of the archives processes to establish chain of custody as early as possible, thereby increasing authenticity.

Preservation planning programmed logic circuitry may be provided. Such preservation planning programmed logic circuitry may be useful to establish the essential characteristics of records that must persist over time. Scheduled records' essential characteristics should be preserved throughout the archival process regardless of whether methods to protect these characteristics exist. Transfer request programmed logic circuitry relates to a step in the legal transfer of records during which time additional detailed information may be collected. Such transfer request programmed logic circuitry may establishes an agreement to transfer physical and/or legal custody of documentary materials, either for archival or records center storage. It also may establish a standard record of the transfer request at the point when certain details of the transfer are known, supporting subsequent verification.

Package creation programmed logic circuitry may facilitate flexible package creation, during which time additional attributes may be collected. Such package creation programmed logic circuitry may help to package records and associated information, e.g., documentary materials and additional metadata, for transfer to the archival system. Metadata may include number of files, filenames and attributes, who created, when created, how created, structure, description, purpose, etc., at the source institution so as to establish chain of custody as early as possible. Package creation also may involve a packaging tool that operates in connected or disconnected mode. In certain example embodiments, a connected mode may be more automated, whereas a disconnected mode may provide more flexibility.

Transfer programmed logic circuitry may provide for the secure transmission of the electronic records to the archival system. This may include documentary materials and transfer manifest.

Ingest extraction programmed logic circuitry may help to collect metadata from transferred materials including essential characteristics. Such ingest extraction programmed logic circuitry may provide for the unpackaging of transmitted packages to access the individual files in the package and associated metadata. This may include extracting certain metadata about the records' files, which may further include extracting essential characteristics according to asset type templates to capture the currently established essential characteristics for an asset type while still accommodating the capture of new or unique characteristics that may be identified for the transmitted assets. Ingest scanning programmed logic circuitry may check for malware (e.g., viruses) and security classifications. Ingest validation programmed logic circuitry may provide a comprehensive validation process that includes checks that records are in accordance with previous steps. Such ingest validation programmed logic circuitry may initiate a multi-level set of checks that ensure the package received is not corrupt and is in accordance with records of what is supposed to be transferred (e.g., according to business objects, such as transfer agreements, records schedules, transfer manifests, legal transferences, and/or disposition agreements). Ingest assignment of unique ID programmed logic circuitry may assign an immutable, globally-unique identifier to each asset so that it can be tracked and managed over time without any identification ambiguity. Ingest integrity sealing programmed logic circuitry may help to ensure that asset corruption is detected. Such ingest integrity sealing programmed logic circuitry may help to derive a unique hash (e.g., number) for each record and/or for each file of each record based on the content of the record and/or file. The hash does not need to (and, in certain example embodiments, should not) change over the life of the record, and may be used to prove the record has not changed over its life. This process may be performed as soon as packaging occurs. The seal (e.g., hash numbers) may be stored separate from asset (e.g., in the asset catalog) for protection. New record versions may receive their own seal and may have different underlying files, but the original record, including its files, always should be retained.

Preservation storage programmed logic circuitry helps to ensure that records are stored according to handling restrictions and that access controls are in place. That is, assets are stored (e.g., "bit streams" are preserved) in accordance with any handling restrictions, and associated catalog entries are created, capturing essential information used for authenticity, e.g., for tracking the archives contents and capturing essential characteristic values and access and handling controls. This may provide protection of assets in accordance with security and privacy rules, preserve assets in accordance with their dispositions (e.g., retention times), including protection from premature deletion, may provide for adaptation to new versions as electronic formats become obsolete, and eventually delete or purge according to asset's disposition and with appropriate safeguards to ensuring purging is still valid.

5.2.2.2 Ongoing Processes

Accommodations may be made for ongoing authenticity judgment processes. Such accommodations may include, for example, workflows to automate and/or enforce authenticity judgment processes, the checking of integrity seals, reporting on chain of custody data, asset activity logs, and other data, all for the purpose of supporting subsequent and ongoing integrity checks and archivists' viewing of this information for authenticity judgment purposes.

Accommodations also may be made for ongoing preservation and dissemination of assets. Such accommodations may include, for example, identifying, capturing, and implementing security, privacy and handling restrictions, including information assurance mechanisms (e.g., authentication and identification, confidentiality, integrity, and non-repudiation), search metadata, and records' essential characteristic values, to support subsequent asset preservation and dissemination. For preservation, this may include accommodation for establishing new certified digital adaptations of assets, e.g., modern asset formats that maintain essential characteristics, which may include matching assets to digital adapters according to measures based on essential characteristics, to derive modern formats of assets before they become obsolete, and other asset versions, such as redacted assets. Dissemination aspects may support authenticity, for example, by protecting assets, by accurately and completely rendering assets, and by providing "findability" to ensure that any records competing for authenticity can be known to the archivist to make a proper authenticity judgment. Also, ongoing preservation processes may implement mechanisms to avert obsolescence by migrating assets to modern formats without jeopardizing authenticity.

5.2.2.3 Horizontal Functions

Information assurance controls may be provided throughout all processes and on all interfaces. In particular, all interactions (e.g., transfer) with respect to the archives system may include information assurance controls (e.g., may include two-factor authentication with external institutions and access controls internally) in accordance with security and privacy rules. Also, all actions on assets may be tracked and made available for authenticity judgment purposes. That is, all activities performed on assets may be logged to support subsequent reporting in support of provenance. Log data may be added to archival storage as an asset. Log record search keys may be added as metadata for the corresponding assets in archival storage or individual log records may be added as assets in their own right and explicitly linked to corresponding assets via the mechanisms of the asset catalog.

5.2.3 Additional Features and Benefits of Certain Example

Certain example embodiments provide for a more comprehensive asset lifecycle, governance, controls, and tracking, while also providing for a higher degree of authenticity assurance. Additional interfaces (such as the packaging tool noted earlier) and processes for receiving assets into the archives from external legal enterprises, e.g., separate agencies and businesses also may be provided. It will be appreciated that certain example embodiments extend the meaning of provenance to include not only the origin of the records and/or data files and their custodial history, but also the history of all actions taken on those records and/or data files within the records archives system. This may provide additional flexibility as policies on how to establish authenticity change over time by providing additional information that can be exploited by such policies.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A computer-implemented method tangibly embodied by at least instructions stored on a computer-readable storage medium for establishing and maintaining authenticity of a plurality of records and/or documentary materials persisted in an electronic archives system, the method comprising:
    inspecting transfer media from a transferring entity to ensure that said transfer media contains at least one ingested record and/or documentary material;
    storing the at least one ingested record and/or documentary material in a temporary storage location;
    ensuring that the transfer media is mounted for upload into the system;
    performing at least one security and/or integrity check on the transfer media;
    performing at least one validation check on the at least one record's and/or documentary material's bit-stream;
    storing the at least one record and/or documentary material to at least one managed storage location;
    resolving any outstanding verification issues with the transferring entity; and
    persisting necessary metadata for the at least one record's and/or documentary material's lifecycle,
    wherein the archives system is scalable essentially without limitation, and
    wherein the authenticity of the plurality of records and/or documentary materials is comprehensively storable and maintainable over an extended period of time and obsolescence-proof despite changeability of the records and/or documentary materials, record and/or documentary material custody, and/or essential characteristic definitions.

2. The method of claim 1, further comprising:
    when the transfer media is stored in the temporary storage location, validating the at least one record and/or documentary material via 2-Factor Authentication; and
    logging any identification and authentication activity in response to the 2-Factor Authentication.

3. The method of claim 1, further comprising when the transfer media is stored to the temporary storage location, auditing and logging system activity.

4. The method of claim 1, further comprising conducting virus and/or security restriction scans during the performance of the at least one security and/or integrity check and/or during the at least one validation check.

5. The method of claim 1, further comprising logging the Virus/SAR scan version.

6. The method of claim 1, further comprising:
    performing intelligibility processing within the at least one validation check, including ensuring that the at least one record and/or documentary material can be opened and used; and
    applying an integrity seal to the at least one record and/or documentary material.

7. The method of claim 6, further comprising auditing and/or logging the performing of the intelligibility processing and/or the applying of the integrity seal.

8. The method of claim 1, further comprising during the at least one validation check, validating the at least one record's and/or documentary material's contents against transfer documentation from the transferring entity.

9. The method of claim 8, further comprising retaining from the transfer documentation header information that identifies the at least one record's and/or documentary material's context and logging system activity.

10. The method of claim 1, further comprising:
    during the at least one validation check, performing at least one fixity check, including at least record validation against a disposition agreement and/or any other related business object;
    retaining item characteristics; and
    logging system activity.

11. The method of claim 1, further comprising placing the at least one record and/or documentary material in archival storage and generating lifecycle metadata that supports searchability for the at least one record and/or documentary material.

12. The method of claim 1, further comprising an acquiring process, an ongoing process, and/or at least one horizontal function.

13. The method of claim 12, wherein the acquiring process comprises designating one or more ingested records and/or documentary materials, determining dispositions for the one or more designated records and/or documentary materials, and collecting information about the one or more designated records and/or documentary materials.

14. The method of claim 12, wherein the collecting of information further comprises collecting any existing appraisals, custodial history, purpose, and/or context information for each of the ingested records and/or documentary materials.

15. The method of claim 12, wherein the acquiring process comprises establishing any essential characteristics of each ingested record and/or documentary material that must persist over time.

16. The method of claim 12, wherein the acquiring process comprises extracting any legal transfer information pertaining to each ingested record and/or documentary material and/or establishing a standardized record of a transfer request.

17. The method of claim 16, wherein the legal transfer information includes an agreement to transfer physical and/or legal custody of records and/or documentary materials.

18. The method of claim 12, wherein the acquiring process comprises facilitating flexible package creation, each package including one or more ingested records and/or documentary materials and associated information.

19. The method of claim 18, wherein the associated information includes records and/or documentary materials and/or metadata.

20. The method of claim 19, wherein the metadata includes number of files, filename(s) and attributes, creator, time of creation, method of creation, structure, description, and/or purpose.

21. The method of claim 12, wherein the acquiring process comprises providing for secure and reliable transmission of records, documentary materials, and/or transfer manifests.

22. The method of claim 12, wherein the acquiring process comprises unpacking each transmitted package and accessing collected information, metadata, and/or essential characteristics for any records and/or documentary materials included in each said package and/or each said package.

23. The method of claim 12, wherein the acquiring process comprises checking ingested records for malware and security classifications.

24. The method of claim 12, wherein the acquiring process comprises providing a comprehensive validation process that checks that each ingested record and/or documentary material is not corrupt and/or accords with a history of what is supposed to be transferred.

25. The method of claim 24, wherein the history includes a transfer agreement, record schedule, transfer manifest, legal transference, and/or disposition agreements.

26. The method of claim 12, wherein the acquiring process comprises assigning an immutable, globally-unique identifier to each ingested record and/or documentary material so that each said ingested record and/or documentary material can be tracked and managed over time substantially free from identification ambiguity.

27. The method of claim 12, wherein the acquiring process comprises generating an integrity seal to be used to detect record and/or documentary material corruption.

28. The method of claim 27, wherein the seal generation includes deriving a unique hash for each ingested record and/or documentary material and/or for each file of each ingested record and/or documentary material based on record and/or file content as records are ingested.

29. The method of claim 28, further comprising preserving the hash throughout the record's and/or documentary material's lifecycle.

30. The method of claim 28, further comprising storing the hash separate from the corresponding record and/or documentary material and/or file.

31. The method of claim 12, wherein the acquiring process comprises ensuring that ingested records and/or documentary materials are stored according to handling restrictions and that access controls are implemented.

32. The method of claim 31, further comprising storing bit streams of a record and/or documentary material in accordance with any associated handling restrictions.

33. The method of claim 12, wherein the ongoing process comprises enforcing an authenticity judgment process, checking integrity seals, reporting on chain of custody data, and/or maintaining and/or reporting on asset activity logs.

34. The method of claim 12, wherein the ongoing process comprises identifying, capturing, and implementing security, privacy, and/or handling restrictions, and/or searching metadata and/or a record's and/or documentary material's essential characteristics.

35. The method of claim 12, wherein the ongoing process comprises migrating a record and/or documentary material to a modern format while maintaining authenticity of the record and/or documentary material.

36. The method of claim 12, wherein the ongoing process comprises providing findability to ensure that any records and/or documentary materials competing for authenticity are known.

37. The method of claim 12, wherein the horizontal functions process comprises providing information assurance controls throughout all processes and on all interfaces.

38. The method of claim 12, wherein the horizontal functions process comprises logging all actions pertaining to a particular record and/or documentary material for authenticity judgment purposes.

* * * * *